US012080316B2

(12) United States Patent
Bromand et al.

(10) Patent No.: US 12,080,316 B2
(45) Date of Patent: *Sep. 3, 2024

(54) NOISE SUPPRESSOR

(71) Applicant: Spotify AB, Stockholm (SE)

(72) Inventors: Daniel Bromand, Boston, MA (US); Mauricio Greene, Piedmont, CA (US)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,840

(22) Filed: Feb. 14, 2023

(65) Prior Publication Data

US 2023/0197100 A1 Jun. 22, 2023

Related U.S. Application Data

(63) Continuation of application No. 17/462,660, filed on Aug. 31, 2021, now Pat. No. 11,682,411.

(51) Int. Cl.

*G10L 21/0232* (2013.01)
*G10L 21/0216* (2013.01)
*H04R 1/40* (2006.01)
*H04R 3/00* (2006.01)

(52) U.S. Cl.

CPC .......... *G10L 21/0232* (2013.01); *H04R 1/406* (2013.01); *H04R 3/005* (2013.01); *G10L 2021/02166* (2013.01); *H04R 2410/07* (2013.01)

(58) Field of Classification Search

CPC ....... G10L 2021/02166; G10L 21/0208; G10L 21/0232; G10L 21/02; G10L 21/0216; G10L 21/038; G10L 21/06; G10L 25/30; G10L 2021/02165; H04R 2499/13; H04R 3/005; H04R 1/406; H04R 2410/07; H04R 2227/009; H04R 27/00; H04R 3/002; H04R 5/027; H04B 1/38; H04L 27/362; H04L 5/0057; H04W 72/21

USPC ........................................ 381/56–59; 700/94

See application file for complete search history.

(56) References Cited

U.S. PATENT DOCUMENTS 9,343,056 B1 * 5/2016 Goodwin ............. G10K 11/002
9,640,194 B1 * 5/2017 Nemala ............... G10L 21/0232
9,838,815 B1 12/2017 Zhang et al.
10,523,170 B1 12/2019 Brailovskiy et al.

(Continued)

FOREIGN PATENT DOCUMENTS

CN 110010126 7/2019
EP 1450354 8/2004

OTHER PUBLICATIONS

Baghdasaryan, D. "Real-Time Noise Suppression Using Deep Learning", Towards Data Science, Dec. 22, 2018, 15 pages.

(Continued)

*Primary Examiner* — Lun-See Lao

(74) *Attorney, Agent, or Firm* — Merchant & Gould P.C.

(57) ABSTRACT

Apparatus, methods and computer-readable medium are provided for processing wind noise. Audio input is processed by receiving an audio input. A wind noise level representative of a wind noise at the microphone array is measured using the audio input and a determination is made, based on the wind noise level, whether to perform either (i) a wind noise suppression process on the audio input on-device, or (ii) the wind noise suppression process on the audio input on-device and an audio reconstruction process in-cloud.

18 Claims, 11 Drawing Sheets

(56) References Cited

U.S. PATENT DOCUMENTS

| | | | |
|---|---|---|---|
| 10,586,523 | B1 | 3/2020 | Kohler et al. |
| 10,721,562 | B1 | 7/2020 | Rui et al. |
| 10,841,693 | B1 | 11/2020 | Ganeshkumar et al. |
| 11,302,298 | B2 * | 4/2022 | Liu ......................... G01P 15/18 |
| 11,682,411 | B2 * | 6/2023 | Bromand ............ G10L 21/0208 381/56 |
| 2004/0165736 | A1 | 8/2004 | Hetherington et al. |
| 2010/0278352 | A1 | 11/2010 | Petit et al. |
| 2011/0103615 | A1 | 5/2011 | Sun |
| 2011/0158419 | A1 * | 6/2011 | Theverapperuma ......................... H04R 1/1083 381/71.1 |
| 2014/0219471 | A1 | 8/2014 | Deshpande et al. |
| 2014/0350924 | A1 | 11/2014 | Zurek et al. |
| 2016/0078880 | A1 * | 3/2016 | Avendano ............... G10L 21/02 704/228 |
| 2017/0345433 | A1 | 11/2017 | Dittmar et al. |
| 2018/0277138 | A1 | 9/2018 | Kudryavtsev et al. |
| 2018/0308469 | A1 * | 10/2018 | Sugai ............... G10K 11/17813 |
| 2019/0043520 | A1 | 2/2019 | Kar et al. |
| 2019/0073999 | A1 | 3/2019 | Premont et al. |
| 2019/0244627 | A1 | 8/2019 | Sapozhnykov et al. |
| 2019/0253795 | A1 | 8/2019 | Ozcan et al. |
| 2020/0219493 | A1 | 7/2020 | Li et al. |
| 2021/0074283 | A1 | 3/2021 | Park |
| 2023/0063839 | A1 | 3/2023 | Bromand |

OTHER PUBLICATIONS

Defossez, A., et al., "Music Source Separation in the Waveform Domain", Nov. 25, 2019, ahl-02379796, 16 pages.

European Extended Search Report in Application 22150777.5, mailed Jun. 15, 2022, 7 pages.

Kelger, M., et al. "Deep Speech Inpainting of Time-frequency Masks", Interspeech 2020, Oct. 25-29, 2020, Shanghai China, pp. 3276-3280.

Rhodes, Anthony D., "Real-Time Wind Noise Detection and Suppression with Neutral-Based Signal Reconstruction for Multi-Channel, Low-Power Devices", retrieved from the internet on Oct. 1, 2017 at: https://arxiv.org/ftp/arxiv/papers/1710/1710.00082.pdf, 5 pages.

Schils, M., "Master's Thesis: Audio frame reconstruction from incomplete observations using Deep Learning techniques", Liege University Library, Academic Year 2019-2020, 72 pages, http://hdl.handle.net/2268.2/10138.

Sokolovsky, M., "Designing Convolutional Neural Networks and Autoencoder Architectures for Sleep Signal Analysis", A Thesis Submitted to the Faculty of the Worcester Polytechnic Institute, Apr. 2018, 46 pages.

* cited by examiner

NOISE SUPPRESSOR

CROSS REFERENCE TO RELATED APPLICATIONS

This application claims priority to and is a Continuation of U.S. patent application Ser. No. 17/462,660, filed Aug. 31, 2021, which application is incorporated herein by reference in its entirety herein.

TECHNICAL FIELD

The present disclosure relates to technical solutions for processing an audio input to obtain processed audio signals, and more particularly to processing an audio input containing speech input and wind noise to mitigate the effect of the wind noise.

BACKGROUND

In speech processing, the constituent components of an audio input are usually the utterances of target speakers interfered by noise or simultaneously speaking persons. One source of noise is wind noise. Wind noise can arise from an airflow at or near a microphone which causes pressure variations detected as sound waves.

Wind that causes the wind noise may be generated in various ways. In some examples, it may be a naturally generated wind that varies randomly. In other examples, the wind may be a constant air flow such as that which arises from a nearby fan or air vent. The wind noise generated by wind can wholly or partially obscure target speech audio which is desired to be captured by a microphone. Consequently, such wind noise can have a detrimental effect on the operation of electronic devices in a home, office and/or vehicle that may be controlled by a voice command of a user. A user in a moving vehicle, for example, may have limited attention available for interacting with a media playback device due to the need to concentrate on travel related activities, such as driving and navigation. Therefore, while a vehicle is moving, it can be difficult for a user in the vehicle to safely interact with a media playback device without disrupting the driving or navigating. Devices that provide voice-based user interfaces encounter significant challenges to use in a vehicle environment. The passenger areas of a vehicle are often noisy due to engine noise, road noise, wind noise (e.g., from an air vent) and any currently-playing media content items. This noise hampers the ability of a user to interact with the voice-based user interface.

Automatic speech recognition (ASR) technology uses machines and software to identify and process spoken language. This technology has advanced significantly in recent years, but does not always yield perfect results. In the process of recognizing speech and translating it into text form, some words may be left out or mistranslated. A common metric of the performance of an ASR system, particularly a metric of missed words, is obtained by measuring the Word Error Rate (WER). Generally, WER is the number of errors divided by the total words. One technique for calculating WER involves adding up substitutions, insertions, and deletions that occur in a sequence of recognized words, and then dividing that number by the total number of words originally spoken. The result is the WER. WER can be expressed as the following formula: WER=(Substitutions+Insertions+Deletions)/Number of Words Spoken. A relatively low WER typically correlates to a better performing ASR system.

Another metric, referred to herein as Intent Error Rate (IER), evaluates the number of intent detection errors caused by a transcription error. Intent error rate can be computed, for example, by collecting an audio file and a correct transcription of that audio file, transcribing the audio file, classifying both transcriptions into intents. The expected and actual transcriptions are each classified, then the expected and predicted intents are compared. The IER puts the performance of the speech-to-text model into context. A 22% Intent Error Rate, for example, means that the ASR system failed to predict the user's intent correctly 22% of the time.

Nowadays, voice controlled devices may have a wake-word detector that executes an algorithm that monitors a stream of audio for a special wake-word that activates the device upon detecting it. A wake-word is a special word or phrase that is meant to activate a device when spoken. Wake-word, is also referred to as "hotword", "trigger word", "activation trigger", "wake up word", "wake-phrase" and the like. Wind noise can also have a detrimental effect on such wake-word detectors causing the voice controlled devices to misinterpret or completely ignore a spoken wake-word.

Edge computing is the data processing that takes place at the network edge. Cloud computing on the other hand, is an internet-based computing that provides shared processing of resources and data to computers and other devices based on demand. The cloud computing provides access to the resources like networks, servers, storage, applications and services.

Typical wake-word detectors work at the edge of a network (vs. in-cloud). They run on the edge for several reasons, including to address latency issues, privacy concerns, practicality (e.g., it is impractical to stream audio from every voice-enabled device to the cloud), to reduce demands on cloud and data center resources, and for power efficiency.

In some situations, however, a user's voice and wind noise are generated and detected together making it difficult for the ASR system on the voice controlled device to accurately recognize some or all of the utterance spoken by a user. Consequently, a control of the device corresponding to an utterance containing a voice command of the user may not be performed properly. Accordingly, to more consistently enable voice recognition technology control to process the voice command of the user, it is necessary to suppress the effect of the wind noise for the purpose of reducing WER in the ASR system.

SUMMARY

The present disclosure provides methods, apparatuses, and computer-readable products for processing an audio input to obtain a processed audio input, and more particularly for processing an audio input containing speech input and wind noise to mitigate the effect of the wind noise by processing the audio input according to the extent of the wind noise.

In an example embodiment there is provided an apparatus for processing wind noise, comprising: a microphone array configured to detect audio input; a wind detector configured to receive the audio input from the microphone array, measure a wind noise level representative of a wind noise at the microphone using the audio input, and determine, based on the wind noise level, whether to perform either (i) a wind noise suppression process on the audio input on the apparatus (e.g., on-device), or (ii) the wind noise suppression process on the audio input on the apparatus (e.g., on-device) and an audio reconstruction process in-cloud. In some embodiments, the apparatus is an edge device.

In some embodiments, the apparatus further comprises an on-device audio signal processor configured to perform, when the wind noise level is below a first threshold, signal processing on the audio input on the apparatus (e.g., on-device). In some embodiments, the apparatus further comprises an on-device noise processor configured to perform, when the wind noise level is above a first threshold, a wind noise suppression process on the audio input on the apparatus (e.g., on-device). In yet other embodiments, the apparatus further comprises an on-device noise processor configured to perform, when the wind noise level is above a second threshold: a wind noise suppression process on the audio input on the apparatus (e.g., on-device), and transmit to an in-cloud audio processing server an instruction causing the in-cloud audio processing server to perform the audio reconstruction process on an output of the wind noise suppression process. In an example implementation, the second threshold is greater than the first threshold.

In some embodiments, the apparatus further comprises a command confirmation engine configured to receive an indication of an inability to suppress the wind noise level; and communicate through an interface a message indicating the inability to suppress the wind noise.

In some embodiments, the wind detector is further configured to: measure, from the audio input, audio signals at frequencies and amplitudes associated with wind noise; and determine, from the frequencies and amplitudes of the audio signals, the wind noise level corresponding to the wind noise.

Another embodiment described herein provides a method for processing an audio input, comprising: receiving, from a microphone array communicatively coupled to an edge device, an audio input; measuring, using the audio input, a wind noise level corresponding to a wind noise; and determining, based on the wind noise level, whether to perform either (i) a wind noise suppression process on the audio input on the edge device, or (ii) the wind noise suppression process on the audio input on the edge device and an audio reconstruction process in-cloud.

In some embodiments, the method further comprises: performing, when the wind noise level is below a first threshold, signal processing on the audio input on the edge device.

In some embodiments, the method further comprises performing, when the wind noise level is above a first threshold, a wind noise suppression process on the audio input on the edge device.

In some embodiments, the method further comprises performing, when the wind noise level is above a second threshold, a wind noise suppression process on the audio input on the edge device, thereby generating on-device processed audio input, and transmitting to an in-cloud audio processing server an instruction causing the in-cloud audio processing server to perform the audio reconstruction process on the on-device processed audio input. In an example implementation, the second threshold is greater than the first threshold.

In some embodiments, the method further comprises determining an inability to suppress the wind noise; and communicating through an interface a message indicating the inability to suppress the wind noise.

In some embodiments, the method further comprises measuring, from the audio input, audio signals at frequencies and amplitudes associated with wind noise; and determining, from the frequencies and amplitudes of the audio signals, the wind noise level corresponding to the wind noise.

In yet another embodiment, there is provided a non-transitory computer-readable medium having stored thereon one or more sequences of instructions for causing one or more processors to perform: receiving, from a microphone array communicatively coupled to an edge device, an audio input; measuring, using the audio input, a wind noise level corresponding to a wind noise; and determining, based on the wind noise level, whether to perform either (i) a wind noise suppression process on the audio input on the edge device (e.g., on-device), or (ii) the wind noise suppression process on the audio input on the edge device and an audio reconstruction process in-cloud.

In some embodiments, the non-transitory computer-readable medium further has stored thereon a sequence of instructions for causing the one or more processors to perform: signal processing on the audio input on the edge device (e.g., on-device) when the wind noise level is below a first threshold.

In some embodiments, the non-transitory computer-readable medium further has stored thereon a sequence of instructions for causing the one or more processors to perform: a wind noise suppression process on the audio input on the edge device when the wind noise level is above a first threshold.

In some embodiments, the non-transitory computer-readable medium further has stored thereon a sequence of instructions for causing the one or more processors to perform: a wind noise suppression process on the audio input on the edge device, thereby generating on-device processed audio input when the wind noise level is above a second threshold, and transmitting to an in-cloud audio processing server an instruction causing the in-cloud audio processing server to perform the audio reconstruction process on the on-device processed audio input. In an example implementation, the second threshold is greater than the first threshold.

In some embodiments, the non-transitory computer-readable medium further has stored thereon a sequence of instructions for causing the one or more processors to perform: determining an inability to suppress the wind noise; and communicating through an interface a message indicating the inability to suppress the wind noise.

In some embodiments, the non-transitory computer-readable medium further has stored thereon a sequence of instructions for causing the one or more processors to perform: measuring, from the audio input, audio signals at frequencies and amplitudes associated with wind noise; and determining, from the frequencies and amplitudes of the audio signals, the wind noise level corresponding to the wind noise.

BRIEF DESCRIPTION OF THE DRAWINGS

The features and advantages of the present disclosure will become more apparent from the detailed description set forth below when taken in conjunction with the following drawings.

DETAILED DESCRIPTION

Figure 1:
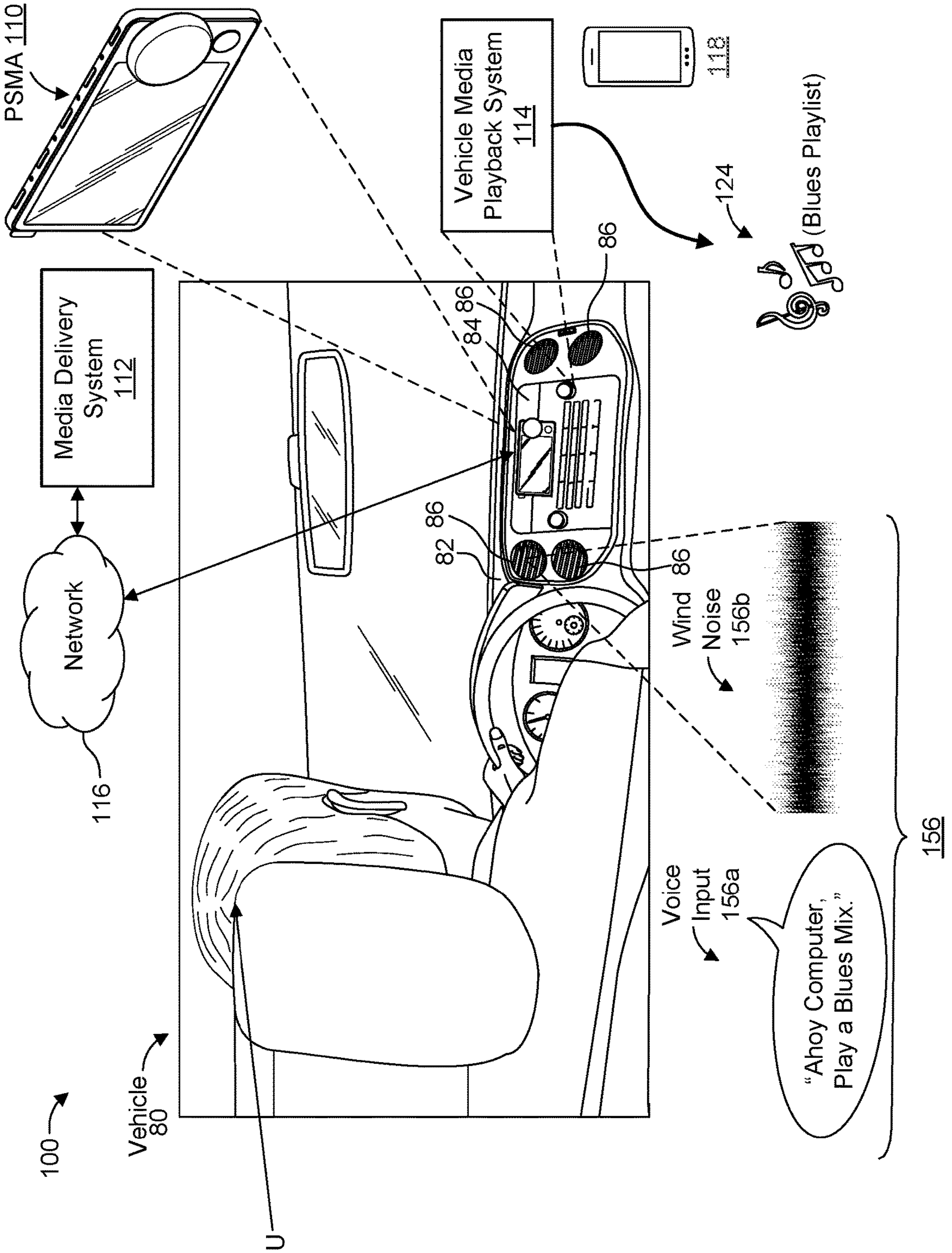
FIG. 1 illustrates a system for streaming media content for playback in accordance with an exemplary embodiment of the present disclosure.

Certain embodiments of systems, devices, components, computing products, modules and processes for processing wind noise are described below. Generally, the example embodiments of the disclosed technology address the drawbacks discussed above by measuring the extent of wind noise and controlling the noise suppression and audio processing operations performed on audio input based on the extent of the wind noise. In an example implementation, a wind detector operates as a side chain controller that measures wind noise level (WNL) representative of wind noise received by one or more microphones and controls whether and how wind noise suppression are performed. Particularly, the wind detector controls whether wind noise suppression is necessary and, if so, whether wind noise suppression should be performed solely on-device (e.g., an edge device or an apparatus), or performed on-device together with additional audio reconstruction processing performed in-cloud.

"In-cloud" as used herein means in a cloud computing environment. For example, in-cloud can mean on a server remote from a device, a device being an edge device or apparatus.

"Edge device" as used herein is a piece of hardware that controls data flow at the boundary between two networks. Edge devices fulfill a variety of roles, depending on what type of device they are, but they essentially serve as network entry—or exit—points.

A "wind noise suppression process" as used herein means any mechanism or process for reducing or eliminating the effects of wind noise in an audio signal.

An "audio reconstruction process" as used herein means any mechanism or process for restoring, recovering or replacing a sound from incomplete audio. The sound can be an original sound or a processed original sound (e.g., an output of a wind noise suppression process). An example audio reconstruction process is called "audio inpainting", which is a process that fills in a gap in an audio segment. "Speech inpainting" as used herein is context-based recovery of missing or degraded information in a time-frequency representation of natural speech. Thus, "speech inpainting" as used herein means any mechanism or process for restoring, recovering or replacing speech information from incomplete speech data (e.g., an utterance).

The example embodiments are described herein in terms of a special-purpose personal appliance for streaming media content in a vehicle. The appliance is also referred to herein as a personal media streaming appliance (PMSA). This description is not intended to limit the application of the example implementations presented herein. In fact, after reading the following description, it will be apparent to one skilled in the relevant art(s) how to implement the following example embodiments in alternative devices, equipment, components, machines, mechanisms or instruments that are at least capable of communicating with one or more computers over a network (e.g., a remote server), receiving audio inputs, and capable of performing the pertinent functions described herein. A PMSA can more generally be referred to as an edge device or simply apparatus.

In addition, while the example implementations described herein are directed to a PMSA mechanically coupled to a front panel of a car (e.g., near a vent, to a mechanical component of a vehicle media playback system, and the like), the PMSA 110 (or microphones of the PMSA 110) can be mechanically coupled to other equipment, such as a helmet, or placed in a pocket of a jacket or shirt. Additionally, the microphones can be arranged in different geometric arrays and positions as described in more detail below in connection with FIG. 6.

Media Streaming System

FIG. 1 illustrates an example media streaming system 100 for streaming media content for playback in accordance with an example embodiment of the present invention. "Media content" as used herein includes audio and video content. Examples of audio content include songs, albums, playlists, radio stations, podcasts, audiobooks, navigation content, weather content, and other audible media content items. Examples of video content include movies, music videos, television programs, and other visible media content items. In many cases, video content also includes audio content.

The system 100 can be used in connection with a vehicle 80. In an example use case, vehicle 80 includes a dashboard 82, a head unit 84 and one or more air vents 86. A "dashboard" as used herein is a control panel set within the central console of a vehicle. A "head unit", sometimes called the infotainment system, as used herein is a component providing a unified hardware interface for the system, including screens, buttons and system controls for numerous integrated information and entertainment functions.

Media streaming system 100 can include one or more media playback devices configured to play media content, such as a personal media streaming appliance (PMSA) 110, a vehicle media playback system 114, and a mobile computing device 118. The system 100 can further include a network 116 (e.g., wired network(s), wireless network(s) or a combination of wired network(s) and wireless network(s)). In an example implementation, media streaming system 100 includes an in-vehicle wireless data communication network, which will be described below in connection with FIG. 2.

Media delivery system 112 provisions services in a cloud computing environment (i.e., in-cloud) and is remote from PMSA 110, where the PMSA 110 operates as an edge device. The PMSA 110 is an apparatus that operates to receive media content that is provided (e.g., streamed, transmitted, etc.) by media delivery system 112, and to transmit the media content to the vehicle media playback system 114 for playback. In some embodiments, PMSA 110 can download and store media content in storage in PMSA 110 and transmit the prestored media content to the vehicle media playback system 114 for playback (i.e., without streaming).

In some implementations, PMSA 110 can transmit the content to mobile computing device 118 for playback by the mobile computing device 118.

In some embodiments, the PMSA 110 is a portable device, which can be carried into and used in the vehicle 80. The PMSA 110 can be mounted to a structure of the vehicle 80, such as the dashboard 82, the head unit 84, and an air vent 86. In other embodiments, the PMSA 110 can be configured to be built in a structure of the vehicle 80. An example of the PMSA 110 is illustrated and described in more detail with reference to FIGS. 2 and 6.

The media delivery system 112 operates to provide media content to one or more media playback devices via network 116. In the illustrated example, the PMSA 110 operates as a playback device. The media delivery system 112 provides media content to the PMSA 110 for playback of the media content using the vehicle media playback system 114. An example of the media delivery system 112 is illustrated and described in further detail herein, such as with reference to FIGS. 3 and 9.

The source of the wind may vary. In some cases, the wind may be generated by one or more air vents 86 of the vehicle 80. In other cases, the wind may be generated from wind sourced from outside of the vehicle 80, such as through an open window (not shown) or open sunroof (not shown).

Still referring to FIG. 1, PMSA 110 operates to receive information via multiple inputs. One type of input is audio input 156. The audio input 156 can include a voice input **156*a* from a user U. The audio input 156 can also include noise input such as wind noise 156*b* (e.g., from an air vent 86). In the illustrated example, a user U speaks a voice input 156*a* which contains the utterance "Ahoy Computer, play a blues mix". Noise in the form of wind noise 156*b* is generated by air vent 86. The audio input 156 including the voice input 156*a* and wind noise 156*b* are received by PMSA 110** for further processing as described herein.

Figure 8:
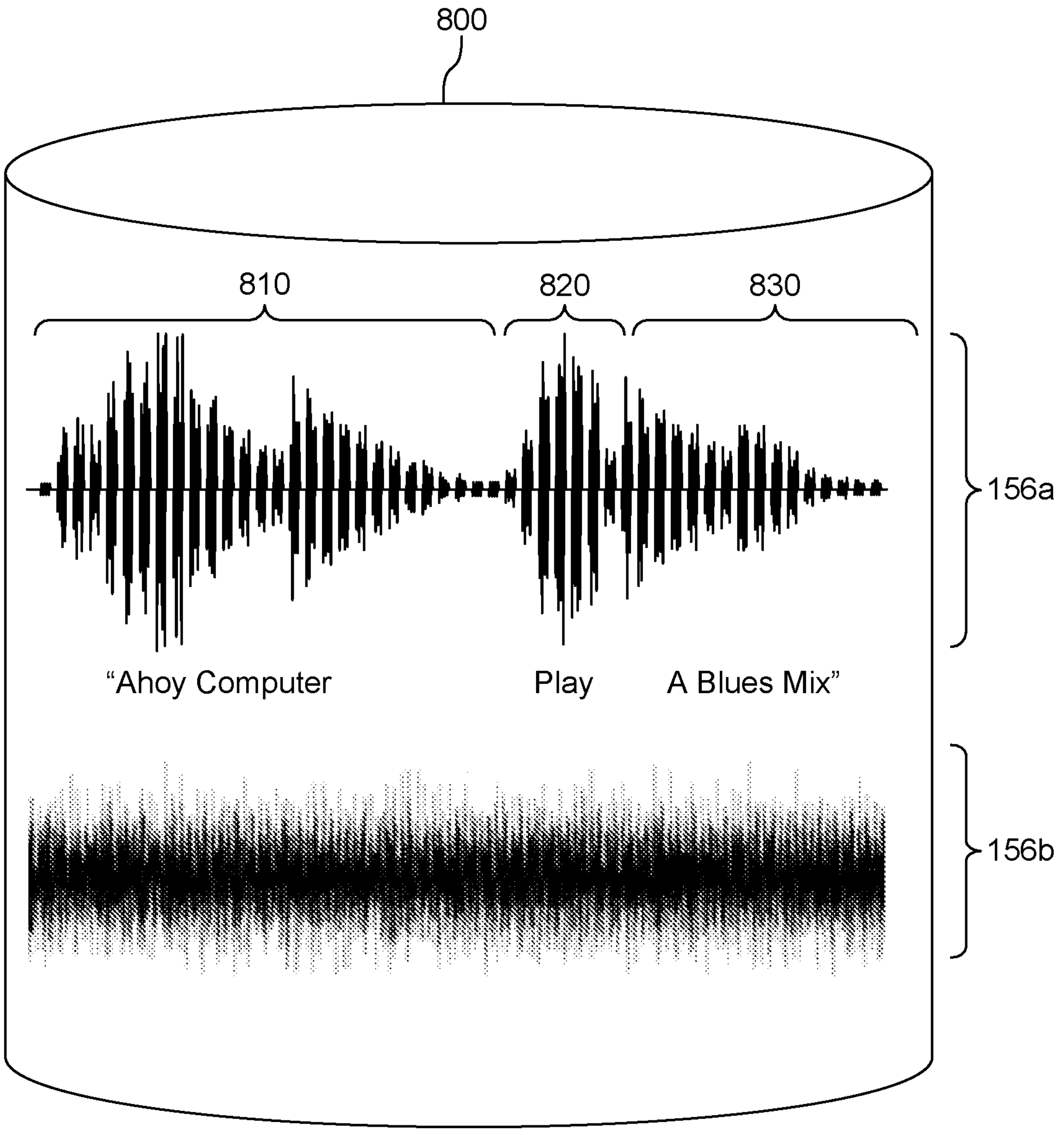
FIG. 8 illustrates an example utterance and wind noise stored in a data store.

FIG. 8 illustrates the example voice input **156*a* and wind noise 156*b* stored in a data store 800 (e.g., temporary memory). The utterance contained in voice input 156*a* includes an activation trigger portion 810, a command portion 820, and a parameter portion 830. In the illustrated example, the activation trigger portion 810 corresponds the phrase "ahoy computer", the command portion 820 corresponds to the phrase "play", and the parameter portion 830** corresponds to the phrase "a blues mix".

In a preferred embodiment, voice input data is received and stored only when a user utters a wake word. Conversations are not recorded. In addition, when listening for a wake-word, short snippets of a few seconds in duration are detected and temporarily stored but deleted if the wake-word is not detected.

Personal media streaming appliance (PMSA) 110 and media delivery system 112 operate to execute one or more services in response to the command portion 820 and parameter portion 830 of the utterance contained in voice input **156*a*. In the illustrated example, media delivery system 112 performs a service that streams media content to PMSA 110 which, in turn, transmits the media content to the vehicle media playback system 114. Vehicle media playback system 114 generates a media output 124 to play the media content in the vehicle 80. As explained below, PMSA 110 performs further processing to account for wind noise and if necessary media delivery system 112 performs yet further processing for the purpose of recognizing the command portion 820 and parameter portion 830**.

An example of the vehicle media playback system 114 is described in more detail with reference to FIG. 4.

Network 116 is a data communication network that facilitates data communication between the PMSA 110 and the media delivery system 112.

As explained below in more detail in connection with FIG. 2, in some embodiments, mobile computing device 118 is communicatively coupled with PMSA 110 either through in-vehicle wireless data communication network 122 or other interface. In some embodiments, network 116 facilitates data communication between the PMSA 110 and the media delivery system 112 via a mobile computing device 118.

In some embodiments, network 116 includes a set of computing devices and communication links between the computing devices. The computing devices in the network 116 use the links to enable communication among the computing devices in the network. Network 116 can include one or more routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 116 includes various types of now known or future developed communication links. For example, the network 116 can include wired and/or wireless links, including cellular, Bluetooth®, ultra-wideband (UWB), 802.11, ZigBee, and other types of wireless links. Furthermore, in various embodiments, the network 116 is implemented at various scales. For example, the network 116 can be implemented as one or more vehicle area networks, local area networks (LANs), metropolitan area networks, subnets, wide area networks (WAN) (such as the Internet), or can be implemented at another scale. Further, in some embodiments, the network 116 includes multiple networks, which may be of the same type or of multiple different types.

In some embodiments, the network 116 can also be used for data communication between other media playback devices (e.g., the mobile computing device 118) and the media delivery system 112. Because the network 116 is configured primarily for data communication between computing devices in the vehicle 80 and computing devices outside the vehicle 80, the network 116 is also referred to herein as an out-vehicle network or out-vehicle data communication.

In some embodiments, a mobile computing device 118 is configured to play media content independently from the PMSA 110. In some embodiments, the mobile computing device 118 is a standalone computing device that, without the PMSA 110 involved, can communicate with the media delivery system 112 and receive media content from the media delivery system 112 for playback in the vehicle 80.

Figure 5:
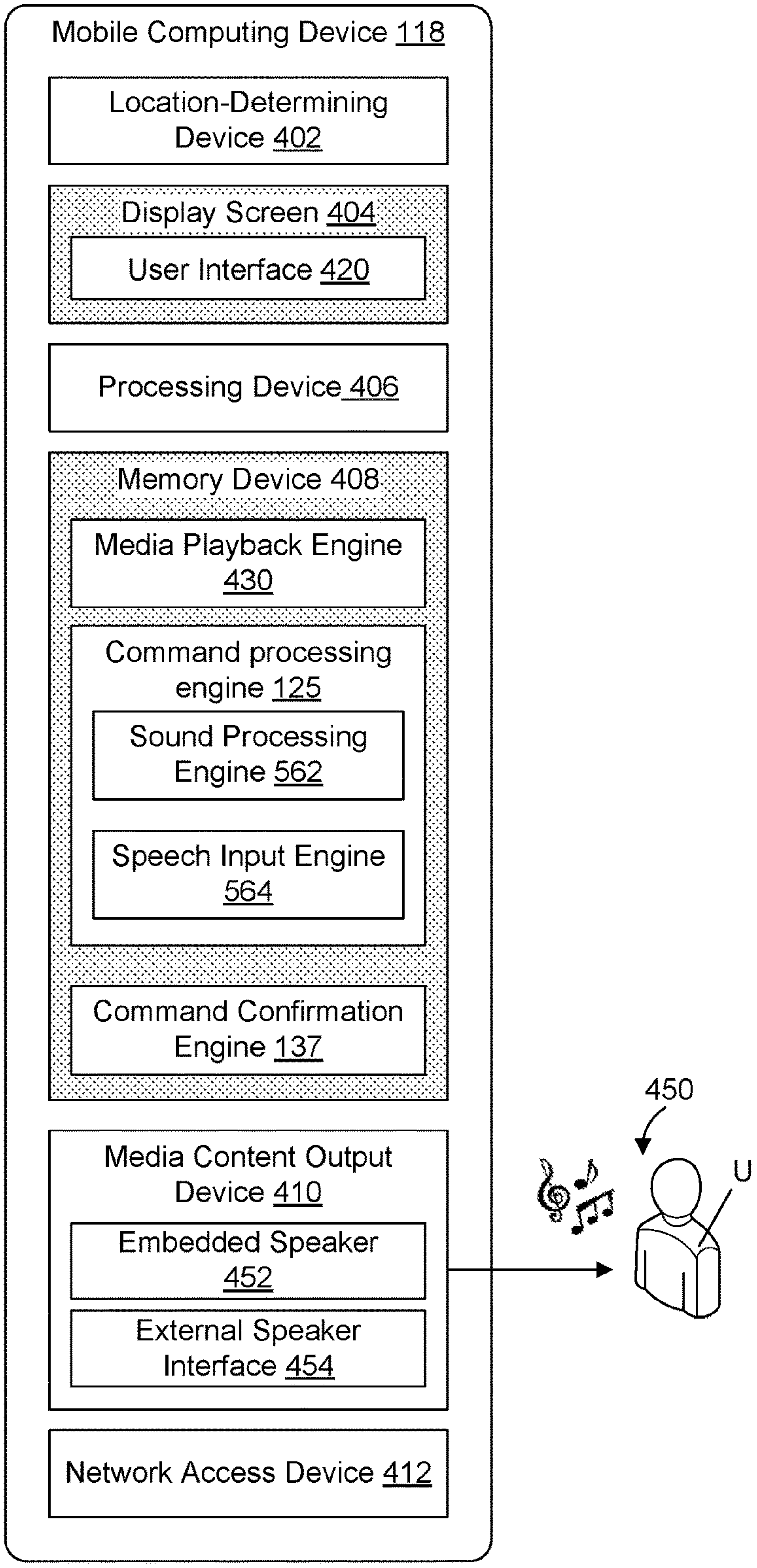
FIG. 5 is a block diagram of an exemplary embodiment of a mobile computing device.

An example of the mobile computing device 118 is illustrated and described in further detail herein, such as with reference to FIG. 5.

Figure 2:
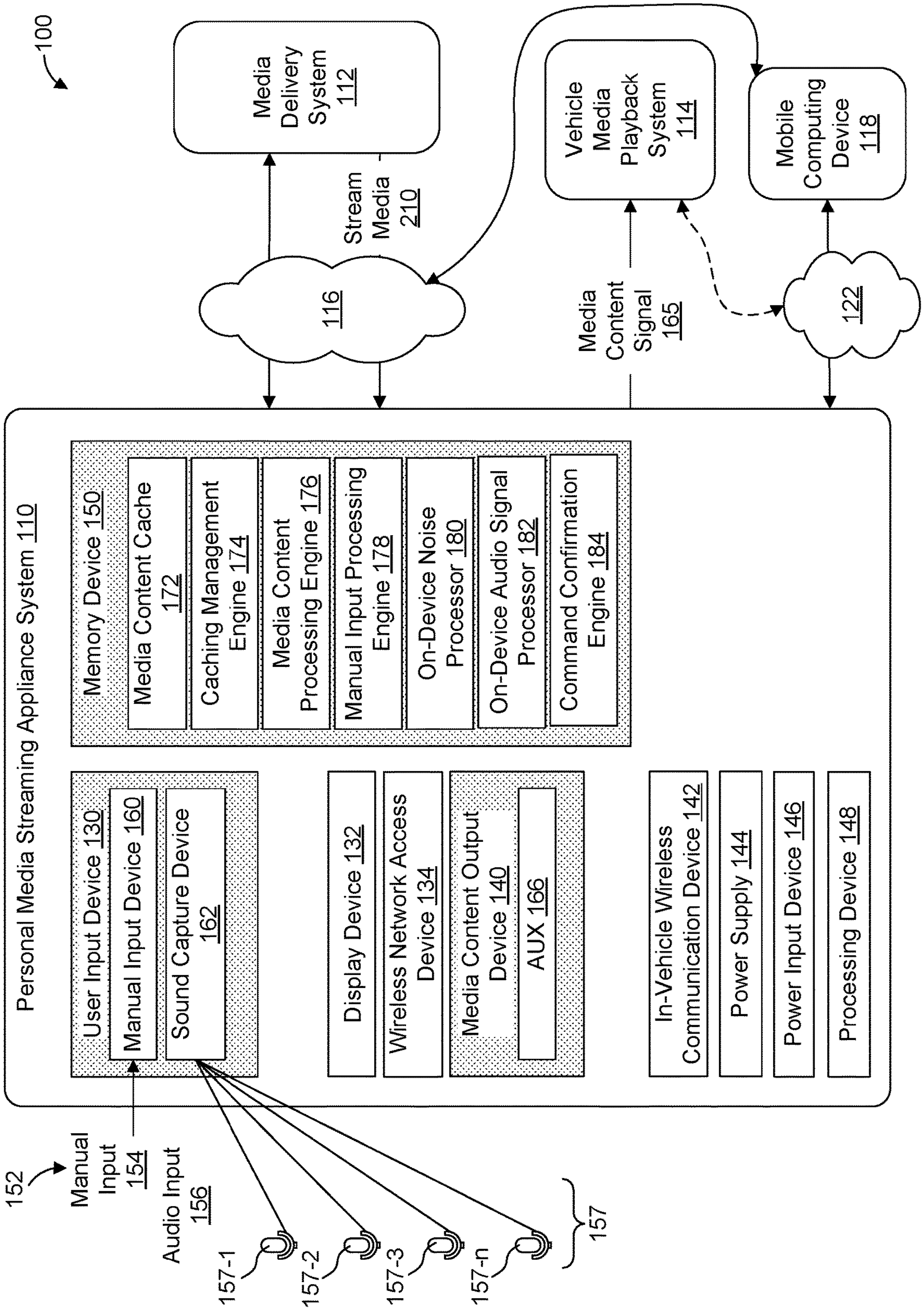
FIG. 2 is a block diagram of an exemplary embodiment of a personal media streaming appliance (PMSA) system.

FIG. 2 is a block diagram of an example embodiment of the PMSA 110 of the media streaming system 100 shown in FIG. 1. In this example, the PMSA 110 includes a user input device 130, a display device 132, a wireless network access device 134, a media content output device 140, an in-vehicle wireless communication device 142, a power supply 144, a power input device 146, a processing device 148, and a memory device 150.

In some embodiments, the PMSA 110 is a system dedicated for streaming personalized media content in a vehicle environment. At least some embodiments of the PMSA 110 have limited functionalities specific for streaming media content from the media delivery system 112 at least via the network 116 and/or for providing other services associated with the media content streaming service. The PMSA 110 may have no other general use such as found in other computing devices, such as smartphones, tablets, and other smart devices. For example, when the PMSA 110 is powered up, the PMSA 110 is configured to automatically activate, restart, or resume a software application that is configured to perform the media content streaming operation dedicated for the PMSA 110 by operating at least one of the components, devices, and elements of the PMSA 110. In some embodiments, the software application of the PMSA 110 is configured to continue running until the PMSA 110 is powered off or powered down to a predetermined level. The PMSA 110 can be configured to be free of any user interface control that would allow a user to disable the activation of the software application on the PMSA 110.

As described herein, the PMSA 110 provides various structures, features, and functions that improve the user experience of consuming media content in an environment that may include sources of wind noise detected by microphone array 157.

As illustrated, the PMSA 110 can communicate with the media delivery system 112 to receive media content via the network 116 and enable the vehicle media playback system 114 to play an audio cue or the media content in the vehicle. In some embodiments, the PMSA 110 can communicate with the mobile computing device 118 that is in data communication with the media delivery system 112. As described herein, the mobile computing device 118 can communicate with the media delivery system 112 via the network 116.

The user input device 130 operates to receive a user input 152 from a user U for controlling the PMSA 110. As illustrated, the user input 152 can include a manual input 154 and an audio input 156. In some embodiments, the user input device 130 includes a manual input device 160 and a sound capture device 162.

The manual input device 160 operates to receive the manual input 154 for controlling playback of media content via the PMSA 110. In addition, in some embodiments, the manual input 154 is received for managing various pieces of information transmitted via the PMSA 110 and/or controlling other functions or aspects associated with the PMSA 110.

In some embodiments, the manual input device 160 includes one or more manual control elements configured to receive various manual control actions, such as pressing actions and rotational actions. As described below in more detail with reference to FIG. 6, the manual input device 160 can include one or more manual control knobs and one or more physical buttons or soft buttons presented by a user interface which may be a touch screen.

The sound capture device 162 operates to detect and record sounds proximate the PMSA 110. For example, the sound capture device 162 can detect sounds illustrated in FIG. 2 as audio input 156. In some embodiments, the sound capture device 162 includes one or more acoustic sensors configured to detect sounds proximate the PMSA 110. As shown in FIG. 2, acoustic sensors of the sound capture device 162 include one or more microphone array 157. It should be understood that various types of microphones can be used in microphone array 157 in cooperation with sound capture device 162 of the PMSA 110.

Referring also to FIG. 8, in some embodiments, the voice input **156*a* portion of audio input 156 is a user's instruction for controlling playback of media content via the PMSA 110. In addition, the voice input 156*a* is a user's voice for managing various data transmitted via the PMSA 110 and/or controlling other functions or aspects associated with the PMSA 110. A voice input 156*a* can function similar to a manual input 154 to control the PMSA 110**.

In some embodiments, the sound capture device 162 is configured to cancel noises from the received sounds so that a desired sound (e.g., the voice input **156*a*) is clearly identified. For example, the sound capture device 162 can include one or more noise-canceling microphones that are configured to filter ambient noise from the audio input 156. In addition or alternatively, a plurality of microphones of the sound capture device 162 is arranged at different locations in a body of the PMSA 110 and/or oriented in different directions with respect to the body of the PMSA 110, so that some of the ambient noise is effectively canceled from the audio input 156** or other desired sounds being identified.

In some embodiments, the sounds detected by the sound capture device 162 can be processed by the on-device noise processor 180 and an on-device audio signal processor (ASP) 182 of the PMSA 110 which are described in more detail below in connection with FIG. 7.

Referring still to FIG. 2, the display device 132 operates to display various pieces of information to the user U. Examples of such information include playback information of media content, notifications, and other information.

The wireless network access device 134 operates to enable the PMSA 110 to communicate, as an edge device, with one or more computing devices at a remote location that is outside the vehicle 80. In the illustrated example, the wireless network access device 134 operates to connect the PMSA 110 to one or more networks outside the vehicle 80, such as the network 116. For example, the wireless network access device 134 is configured to communicate with the media delivery system 112 and receive media content from the media delivery system 112 at least partially via the network 116. The wireless network access device 134 can be a wireless network interface of various types, which connects the PMSA 110 to the network 116.

Examples of the wireless network access device 134 include wireless wide area network (WWAN) interfaces, which use mobile telecommunication cellular network technologies. Examples of cellular network technologies include LTE, WiMAX, UMTS, CDMA2000, GSM, cellular digital packet data (CDPD), and Mobitex. In the some embodiments, the wireless network access device 134 is configured as a cellular network interface to facilitate data communication between the PMSA 110 and the media delivery system 112 over cellular network.

The media content output device 140 is an interface that enables the PMSA 110 to transmit media content to the vehicle media playback system 114. Some embodiments of the PMSA 110 do not have a speaker and thus cannot play media content independently. In these embodiments, the PMSA 110 is not regarded as a standalone device for playing media content. Instead, the PMSA 110 transmits media content to another media playback device, such as the vehicle media playback system 114 or mobile computing device 118 to enable the other media playback device to play the media content, such as through the vehicle stereo system or through the mobile computing device 118.

In some embodiments, PMSA 110 includes a media content processing engine 176 which functions to convert media content to a media content signal 165, the media content output device 140 transmits the media content signal 165 to the vehicle media playback system 114. The vehicle media playback system 114 can play the media content based on the media content signal 165. For example, the vehicle media playback system 114 operates to convert the media content signal 165 into a format that is readable by the vehicle media playback system 114 for playback.

In some embodiments, the media content output device 140 includes an auxiliary (AUX) output interface 166. The AUX output interface 166 is configured to connect the PMSA 110 to the vehicle media playback system 114 via a cable of the PMSA 110 (not shown). In some embodiments, a media content output line extends from the PMSA 110 and is connected to an input connector 340 (FIG. 4) (e.g., an auxiliary input jack or port) of the vehicle media playback system 114. As illustrated herein, the media content output line can be of various types, such as an analog audio cable or a USB cable.

Referring still to FIG. 2, the in-vehicle wireless communication device 142 operates to establish a wireless data communication through the in-vehicle wireless data communication network 122 to enable communication between computing devices in a vehicle 80. Unlike the network 116, the in-vehicle wireless data communication network 122 can be used for data communication between computing devices in the vehicle. In the illustrated example, the in-vehicle wireless data communication network 122 is used between the PMSA 110 and the mobile computing device 118. In other embodiments, the in-vehicle wireless data communication network 122 can also be used for data communication between the PMSA 110 and the vehicle media playback system 114 as represented by the dashed lines between in-vehicle wireless data communication network 122 and vehicle media playback system 114.

Various types of now known or future-developed wireless communication interfaces can be used for the in-vehicle wireless data communication network 122. In some embodiments, the in-vehicle wireless data communication network 122 uses Bluetooth® technology. In other embodiments, the in-vehicle wireless data communication network 122 uses Wi-Fi® technology. In yet other embodiments, other suitable wireless communication interfaces can be used for the in-vehicle wireless data communication network 122, such as near field communication (NFC) and an ultrasonic data transmission. In the illustrated example, the in-vehicle wireless communication device 142 is used to enable the PMSA 110 to communicate with other computing devices via in-vehicle wireless data communication network 122, such as the mobile computing device 118, in the vehicle 80. The in-vehicle wireless communication is also referred to herein as a short-range wireless communication.

The power supply 144 is included in the example PMSA 110 and is configured to supply electric power to the PMSA 110. In some embodiments, the power supply 144 includes at least one battery. The power supply 144 can be rechargeable. For example, the power supply 144 can be recharged using the power input device 146 that is connected to an external power supply. In some embodiments, the power supply 144 is included inside the PMSA 110 and is not removable from the PMSA 110. In other embodiments, the power supply 144 is removable by the user from the PMSA 110. In yet other embodiments power supply 144 is not necessary and therefore not included in PMSA 110.

The power input device 146 is configured to receive electric power to maintain activation of components of the PMSA 110. As described herein, the power input device 146 is connected to a power source of the vehicle 80 and uses the electric power from the vehicle 80 as a primary power source to maintain activation of the PMSA 110 over an extended period of time, such as longer than several minutes.

The processing device 148, in some embodiments, comprises one or more central processing units (CPU). In other embodiments, the processing device 148 additionally or alternatively includes one or more digital signal processors, field-programmable gate arrays, or other electronic circuits.

The memory device 150 typically includes at least some form of computer-readable media. Computer-readable media includes any available media that can be accessed by the PMSA 110. By way of example, computer-readable media include computer-readable storage media and computer-readable communication media.

Computer-readable storage media includes volatile and nonvolatile, removable and non-removable media implemented in any device configured to store information such as computer-readable instructions, data structures, program modules, or other data. Computer-readable storage media includes, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the PMSA 110. In some embodiments, computer-readable storage media is non-transitory computer-readable medium.

Computer-readable communication media typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer-readable communication media includes wired media such as a wired network or direct-wired connection, and wireless media such as acoustic, radio frequency, infrared, and other wireless media. Combinations of any of the above are also included within the scope of computer-readable media.

The memory device 150 operates to store data and instructions. In some embodiments, the memory device 150 stores instructions for a media content cache 172, a caching management engine 174, a media content processing engine 176, a manual input processing engine 178, on-device noise processor 180, on-device audio signal processor (ASP) 182, and command confirmation engine 184.

The media content cache 172 stores media content items, such as media content items that have been received from the media delivery system 112. The media content items stored in the media content cache 172 may be stored in an encrypted or unencrypted format. In some embodiments, the media content cache 172 also stores metadata about media content items such as title, artist name, album name, length, genre, mood, era, etc. The media content cache 172 can further store playback information about the media content items and/or other information associated with the media content items.

The caching management engine 174 is configured to receive and cache media content in the media content cache 172 and manage the media content stored in the media content cache 172. In some embodiments, when media content is streamed from the media delivery system 112, the caching management engine 174 operates to cache at least a portion of the media content into the media content cache 172 so that at least a portion of the cached media content can be transmitted to the vehicle media playback system 114 for playback. In other embodiments, the caching management engine 174 operates to cache at least a portion of media content into the media content cache 172 while online so that the cached media content is retrieved for playback while the PMSA 110 is offline.

The media content processing engine 176 is configured to process the media content that is received from the media delivery system 112, and generate the media content signal 165 usable for the vehicle media playback system 114 to play the media content. The media content signal 165 is transmitted to the vehicle media playback system 114 using the media content output device 140, and then decoded so that the vehicle media playback system 114 plays the media content in the vehicle 80.

The manual input processing engine 178 operates to receive the manual input 154 via the manual input device 160. In some embodiments, when the manual input device 160 is actuated (e.g., pressed or rotated) upon receiving the manual input 154, the manual input device 160 generates an electric signal representative of the manual input 154. The manual input processing engine 178 can process the electric signal and determine the user input (e.g., command or instruction) corresponding to the manual input 154 to the PMSA 110. In some embodiments, the manual input processing engine 178 can perform a function requested by the manual input 154, such as controlling playback of media content. The manual input processing engine 178 can cause one or more other engines to perform the function associated with the manual input 154.

The on-device noise processor 180 is configured to receive sound signals obtained from the sound capture device 162 and process the sound signals to identify different sources of the sounds received via the sound capture device 162. In some embodiments, the on-device noise processor 180 operates to filter the user's voice input 156*a* from noises included in the detected sounds. Various noise cancellation technologies, such as active noise control or cancelling technologies or passive noise control or cancelling technologies, can be used for filtering the voice input from ambient noise. In examples, the on-device noise processor 180 filters out omni-directional noise and preserves directional noise (e.g., an audio input difference between two microphones) in audio input. In examples, the on-device noise processor 180 removes frequencies above or below human speaking voice frequencies. In examples, the on-device noise processor 180 subtracts audio output of the device from the audio input to filter out the audio content being provided by the device (e.g., to reduce the need of the user to shout over playing music). In examples, the on-device noise processor 180 performs echo cancellation. By using one or more of these techniques, the on-device noise processor 180 provides sound processing customized for use in a vehicle environment.

Figure 7:
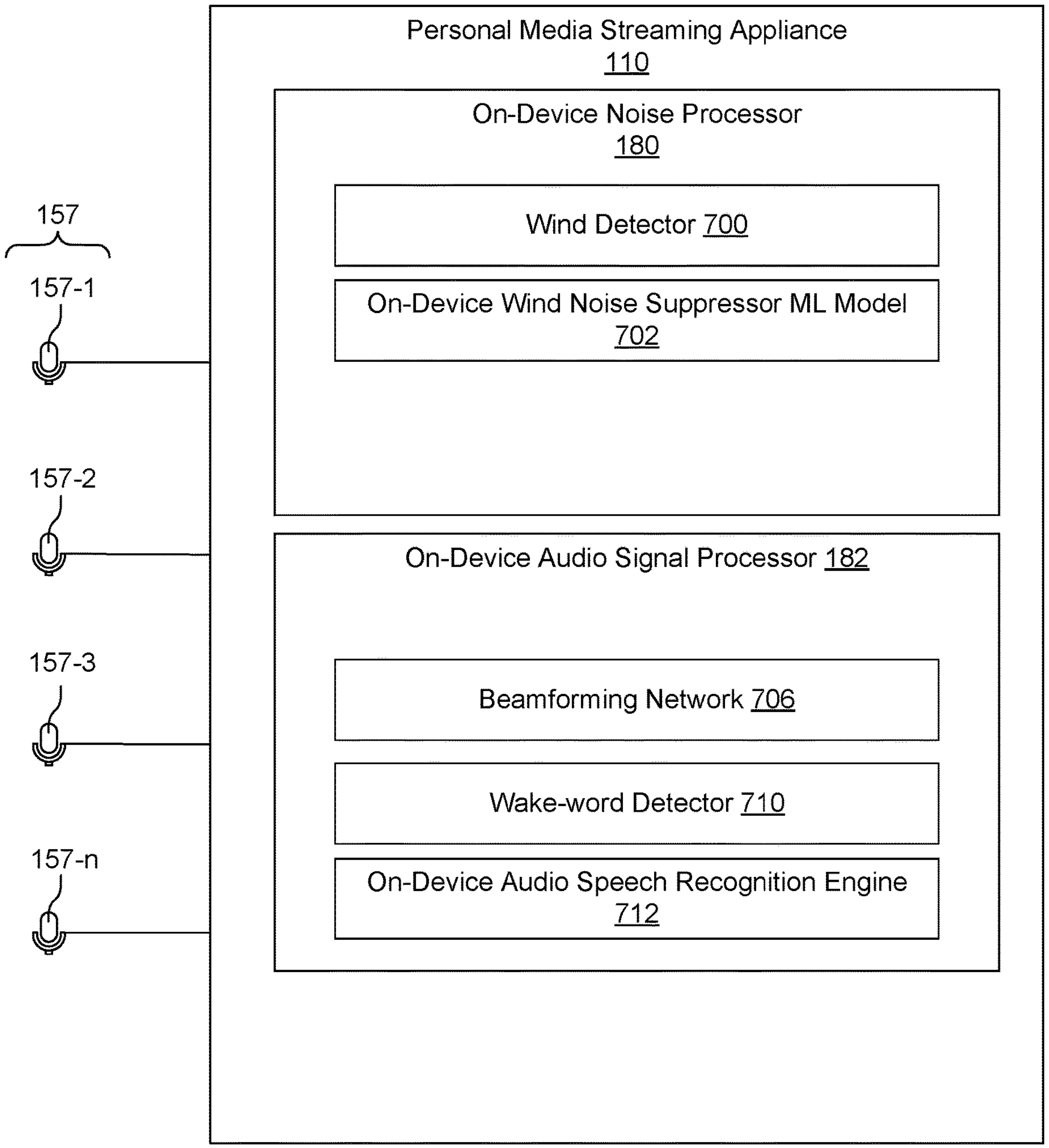
FIG. 7 is a block diagram of an exemplary embodiment of the on-device noise processor and on-device audio signal processor of a personal media streaming appliance application.

FIG. 7 below illustrates example aspects of a PMSA 110 directed to wind noise suppression performed by on-device noise processor 180 in conjunction with on-device audio signal processor 182. In some embodiments, on-device ASP 182 performs some of the functions of the on-device noise processor 180. In some embodiments, on-device ASP 182 performs all of the functions of the on-device noise processor 180.

In some embodiments, on-device ASP 182 operates to process the received sound signals to identify the sources of particular sounds of the sound signals, such voice commands, people's conversation in the vehicle, the vehicle engine sound, or other ambient sounds associated with the vehicle. The on-device ASP 182 also operates to interact with the PMSA 110 and enable the PMSA 110 to perform various voice-related functions.

In some embodiments, on-device audio signal processor 182 analyzes the words and/or the recordings using natural language processing and/or intent recognition technology to determine appropriate actions to take based on the spoken words. In an example implementation, the on-device ASP 182 performs audio speech recognition (ASR) and/or natural language understanding (NLP) to detect commands such as "next", "previous", "play", "stop", and the like. The words may be recognized as commands from the user that alter the playback of media content and/or other functions or aspects of the PMSA 110. In some embodiments, more complicated utterances requiring larger ASR or NLU computations can be performed in-cloud.

Additionally or alternatively, the on-device ASP 182 may determine various sound properties about the sounds proximate the PMSA 110 such as volume, dominant frequency or frequencies, etc. These sound properties may be used to make inferences about the environment proximate to the PMSA 110.

Figure 3:
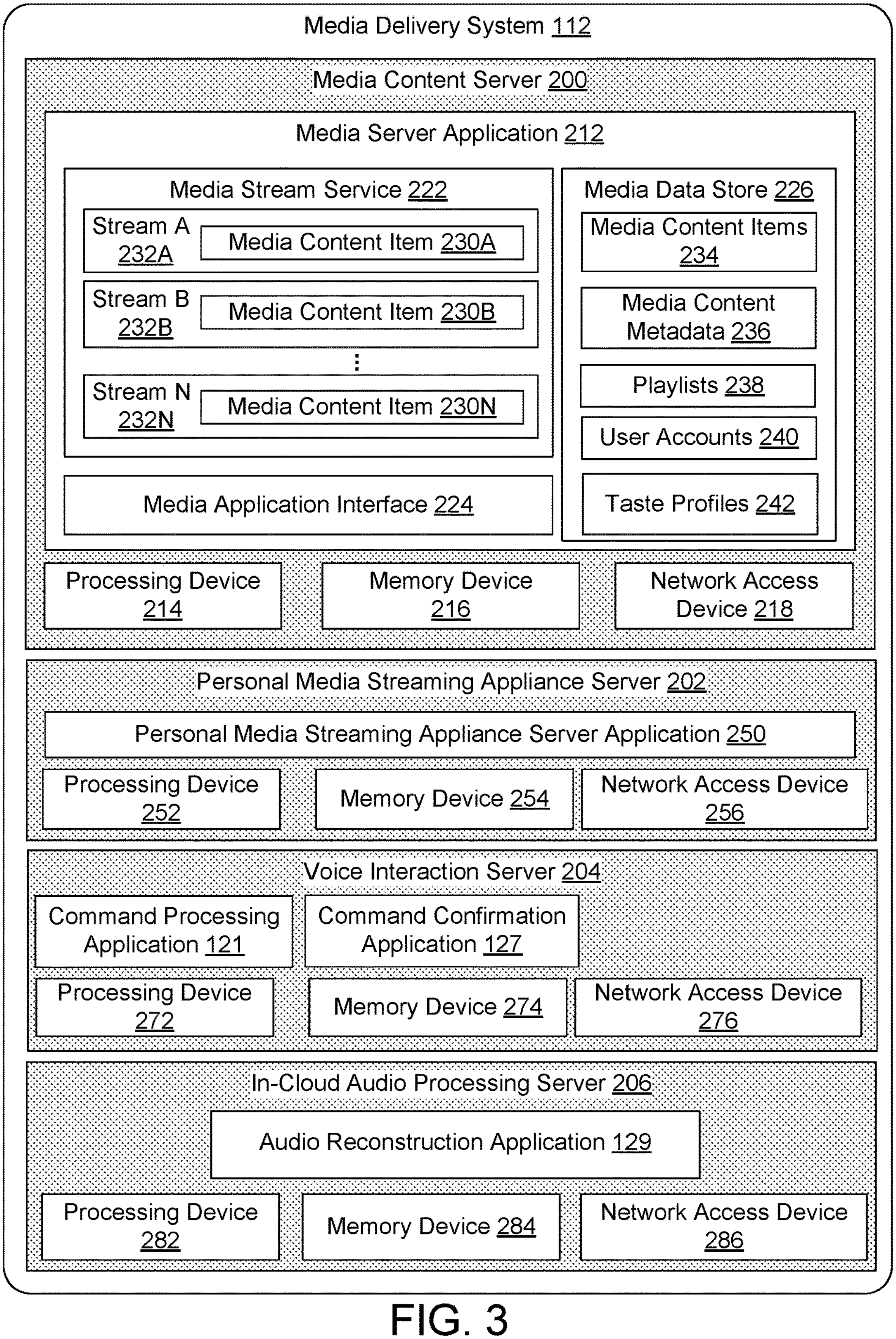
FIG. 3 is a block diagram of an exemplary embodiment of a media delivery system.

The on-device ASP 182 cooperates with the media delivery system 112 (e.g., a voice interaction server 204 thereof as illustrated in FIG. 3) to identify a command (e.g., a user intent) that is conveyed by the voice input 156*a*. In an example implementation, the on-device ASP 182 transmits the audio input 156 to the media delivery system 112 so that the media delivery system 112 operates to determine a command intended by the voice input 156*a* portion of the audio input 156. In addition, some embodiments of the on-device ASP 182 can operate to cooperate with the media delivery system 112 (e.g., the voice interaction server 204 thereof) to provide a voice assistant that performs various voice-based interactions with the user, such as voice feedbacks, voice notifications, voice recommendations, and other voice-related interactions and services.

Allowing some of the processes to be executed on the media delivery system 112 reduces the processing power needed in the PMSA 110. Allowing some of the processes to be executed on the PMSA 110, on the other hand, addresses latency issues, privacy concerns, reduces streaming of audio from PMSA 110 to the cloud and hence reduces demands on cloud and data center resources. Allowing some of the processes to be executed on the PMSA 110 also provides relatively better power efficiency.

Command confirmation engine 184 functions to receive an instruction that indicates whether the command portion and parameter portion of a voice input 156*a* were understood. In some embodiments, the instruction is received from media delivery system 112. In some embodiments, the instruction is received from the on-device ASP 182. The command confirmation engine 184 is further configured to receive an indication of an inability to suppress the wind noise level and communicate through an interface such as display device 132 and/or media content output device 140 a message indicating the inability to suppress the wind noise. For example, the message can be communicated to a user of the PMSA 110 by issuing a message via display device 132 that states "Wind noise from the air vents may be impacting voice recognition. Please try lowering the A/C fan speed."

In some embodiments, the command confirmation engine 184 includes a timer. If the instruction is not received within a predetermined time, the command confirmation engine 184 issues an audible confirmation indicating the instruction was not capable of being processed. Alternatively, the command confirmation engine 184 issues an audible confirmation indicating the instruction is still being processed.

In some embodiments, a command confirmation engine 184 operates to determine whether to first play an audible confirmation or whether to execute the desired command outright. An audible confirmation may be played when the command itself is not understood to notify the user that the command has been received and processed but not understood. Conversely, if the command was understood, then either an audible confirmation is played to notify the user that the command has been received, processed and understood ("Now playing a blues mix"). Alternatively, command confirmation engine 184 operates to not play an audible confirmation and simply execute the desired command outright.

FIG. 3 is a block diagram of an exemplary embodiment of the media delivery system 112 of FIG. 1. The media delivery system 112 includes a media content server 200, a personal media streaming appliance (PMSA) server 202, a voice interaction server 204, and an in-cloud audio processing server 206. In some embodiments, at least one of the media content server 200, the PMSA server 202, and the voice interaction server 204 may be used to perform one or more functions corresponding to the determined user command.

The media delivery system 112 comprises one or more computing devices and provides media content to the PMSA 110 and, in some embodiments, other media playback devices, such as the mobile computing device 118, as well. In addition, the media delivery system 112 interacts with the PMSA 110 to provide the PMSA 110 with various functionalities.

In at least some embodiments, the media content server 200, the PMSA server 202, the voice interaction server 204, and in-cloud audio processing server 206 are provided by separate computing devices. In other embodiments, the media content server 200, the PMSA server 202, the voice interaction server 204, and in-cloud audio processing server 206 are provided by the same computing device(s). Further, in some embodiments, at least one of the media content server 200, the PMSA server 202, the voice interaction server 204, and in-cloud audio processing server 206 is provided by multiple computing devices. For example, the media content server 200, the PMSA server 202, the voice interaction server 204, and in-cloud audio processing server 206 may be provided by multiple redundant servers located in multiple geographic locations.

Although FIG. 3 shows a single media content server 200, a single PMSA server 202, a single voice interaction server 204, and a single in-cloud audio processing server 206, some embodiments include multiple media servers, multiple PMSA servers, multiple voice interaction servers, and/or in-cloud audio processing servers 206. In these embodiments, each of the multiple media servers, multiple PMSA servers, multiple voice interaction servers, and in-cloud audio processing server 206 may be identical or similar to the media content server 200, the PMSA server 202, the voice interaction server 204, and in-cloud audio processing server 206, respectively, as described herein, and may provide similar functionality with, for example, greater capacity and redundancy and/or services from multiple geographic locations. Alternatively, in these embodiments, some of the multiple media servers, the multiple PMSA servers, the multiple voice interaction servers and/or and multiple in-cloud audio processing servers 206 may perform specialized functions to provide specialized services. Various combinations thereof are possible as well.

Referring to FIGS. 2 and 3, the media content server 200 transmits stream media 210 to media playback devices such as the PMSA 110. In some embodiments, the media content server 200 includes a media server application 212, a processing device 214, a memory device 216, and a network access device 218. The processing device 214 and the memory device 216 may be similar to the processing device 148 and the memory device 150, respectively, which have each been previously described. Therefore, the description of the processing device 214 and the memory device 216 are omitted for brevity purposes.

Still referring to FIGS. 2 and 3, the network access device 218 operates to communicate with other computing devices over one or more networks, such as the network 116. Examples of the network access device 218 include one or more wired network interfaces and wireless network interfaces. Examples of such wireless network interfaces of the network access device 218 include wireless wide area network (WWAN) interfaces (including cellular networks) and wireless local area network (WLANs) interfaces. In other examples, other types of wireless interfaces can be used for the network access device 218.

In some embodiments, the media server application 212 is configured to stream media content, such as music or other audio, video, or other suitable forms of media content. The media server application 212 includes a media stream service 222, a media application interface 224, and a media data store 226. The media stream service 222 operates to buffer media content, such as media content items 230A, 230B, and 230N (collectively media content items 230), for streaming to one or more streams 232A, 232B, and 232N (collectively streams 232).

The media application interface 224 can receive requests or other communication from media playback devices or other systems, such as the PMSA 110, to retrieve media content items from the media content server 200. For example, in FIG. 2, the media application interface receives communication from the PMSA 110, such as the caching management engine 174 thereof, to receive media content from the media content server 200.

In some embodiments, the media data store 226 stores media content items 234, media content metadata 236, playlists 238, user accounts 240, and taste profiles 242. The media data store 226 may comprise one or more databases and file systems. Other embodiments are possible as well.

As discussed herein, the media content items 234 (including the media content items 230) may be audio, video, or any other type of media content, which may be stored in any format for storing media content.

The media content metadata 236 provides various information associated with the media content items 234. In some embodiments, the media content metadata 236 includes one or more of title, artist name, album name, length, genre, mood, era, etc.

The media content metadata 236 operates to provide various pieces of information associated with the media content items 234. In some embodiments, the media content metadata 236 includes one or more of title, artist name, album name, length, genre, mood, era, etc.

In some embodiments, the media content metadata 236 includes acoustic metadata, cultural metadata, and explicit metadata. The acoustic metadata may be derived from analysis of the track refers to a numerical or mathematical representation of the sound of a track. Acoustic metadata may include temporal information such as tempo, rhythm, beats, downbeats, tatums, patterns, sections, or other structures.

Referring still to FIG. 3, each of the playlists 238 is used to identify one or more media content items 234. In some embodiments, the playlists 238 are configured to group one or more media content items 234 and provide a particular context to the group of media content items 234. Some examples of the playlists 238 include albums, artists, playlists, and individual media content items. By way of example, where a playlist 238 is an album, the playlist 238 can represent that the media content items 234 identified by the playlist 238 are associated with that album.

As described above, the media data store 226 can include playlists 238. The playlists 238 are used to identify one or more of the media content items 234. In some embodiments, the playlists 238 identify a group of the media content items 234 in a particular order. In other embodiments, the playlists 238 merely identify a group of the media content items 234 without specifying a particular order. Some, but not necessarily all, of the media content items 234 included in a particular one of the playlists 238 are associated with a common characteristic such as a common genre, mood, or era.

In some embodiments, a user can listen to media content items in a playlist 238 by selecting the playlist 238 via a media playback device, such as the PMSA 110. The media playback device then operates to communicate with the media delivery system 112 so that the media delivery system 112 retrieves the media content items identified by the playlist 238 and transmits data for the media content items to the media playback device for playback.

In some embodiments, the playlist 238 includes a playlist title and a list of content media item identifications. The playlist title is a title of the playlist, which can be provided by a user using a media playback device, such as PMSA 110 or mobile computing device 118. The list of content media item identifications includes one or more media content item identifications (IDs) that refer to respective media content items 234.

Each media content item is identified by a media content item ID and includes various pieces of information, such as a media content item title, artist identification (e.g., individual artist name or group name, or multiple artist names or group names), and media content item data. In some embodiments, the media content item title and the artist ID are part of the media content metadata 236, which can further include other attributes of the media content item, such as album name, length, genre, mood, era, etc. as described herein.

At least some of the playlists 238 may include user-created playlists. For example, a user of a media streaming service provided using the media delivery system 112 could create a playlist 238 and edit the playlist 238 by adding, removing, and rearranging media content items in the playlist 238. A playlist 238 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 112 operates to generate a list of media content items recommended for the particular user or the particular group of users. In some embodiments, such recommended media content items can be selected based at least on the taste profiles 242 as described herein. Other information or factors can be used to determine the recommended media content items.

In addition or alternatively, at least some of the playlists 238 are created by a media streaming service provider. For example, such provider-created playlists can be automatically created by the media delivery system 112. In some embodiments, a provider-created playlist can be customized to a particular user or a particular group of users. By way of example, a playlist for a particular user can be automatically created by the media delivery system 112 based on the user's listening history (e.g., the user's taste profile) and/or listening history of other users with similar tastes. In other embodiments, a provider-created playlist can be configured to be available for the public in general. Provider-created playlists can also be sharable with other users.

The user accounts 240 are used to identify users of a media streaming service provided by the media delivery system 112. In some embodiments, a user account 240 allows a user to authenticate to the media delivery system 112 and enable the user to access resources (e.g., media content items, playlists, etc.) provided by the media delivery system 112. In some embodiments, the user can use different devices (e.g., the PMSA 110 and the mobile computing device 118) to log into the user account and access data associated with the user account in the media delivery system 112. User authentication information, such as a username, an email account information, a password, and other credentials, can be used for the user to log into his or her user account.

The taste profiles 242 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to mine music preferences.

In some embodiments, each taste profile 242 is a representation of musical activities, such as user preferences and historical information about the users' consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy", "sexy", etc.

In addition, the taste profiles 242 can include other information. For example, the taste profiles 242 can include libraries and/or playlists of media content items associated with the user. The taste profiles 242 can also include information about the user's relationships with other users (e.g., associations between users that are stored by the media delivery system 112 or on a separate social media site).

The taste profiles 242 can be used for a number of purposes. One use of taste profiles is for creating personalized playlists (e.g., personal playlisting). An API (application programming interface) call associated with personal playlisting can be used to return a playlist customized to a particular user. For example, the media content items listed in the created playlist are constrained to the media content items in a taste profile associated with the particular user. Another exemplary use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another exemplary taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another exemplary use case for taste profiles is referred to as user-to-user recommendation. This API call is used to discover users with similar tastes by comparing the similarity of taste profile item(s) associated with users.

A taste profile 242 can represent a single user or multiple users. Conversely, a single user or entity can have multiple taste profiles 242. For example, one taste profile can be generated in connection with a user's media content play activity, whereas another separate taste profile can be generated for the same user based on the user's selection of media content items and/or artists for a playlist.

Referring still to FIG. 3, the PMSA server 202 operates to provide various functionalities to the PMSA 110. In some embodiments, the PMSA server 202 includes a personal media streaming appliance (PMSA) server application 250, a processing device 252, a memory device 254, and a network access device 256. The processing device 252, the memory device 254, and the network access device 256 may be similar to the processing device 214, the memory device 216, and the network access device 218, respectively, which have each been previously described.

In some embodiments, the PMSA server application 250 operates to interact with the PMSA 110 and enable the PMSA 110 to perform various functions, such as receiving a user manual input, displaying information, providing notifications, performing power management, providing location-based services, and authenticating one or more users for the PMSA 110. The PMSA server application 250 can interact with other servers, such as the media content server 200 and the voice interaction server 204, to execute such functions.

Referring still to FIG. 3, the voice interaction server 204 operates to provide various voice-related functionalities to the PMSA 110. In some embodiments, the voice interaction server 204 includes a command processing application 121, a processing device 272, a memory device 274, and a network access device 276. The processing device 272, the memory device 274, and the network access device 276 may be similar to the processing device 214, the memory device 216, and the network access device 218, respectively, which have each been previously described.

In some embodiments, the command processing application 121 operates to interact with the PMSA 110 and enable the PMSA 110 to perform various voice-related functions, such as voice feedback and voice notifications. In some embodiments, the command processing application 121 is configured to receive data (e.g., speech-to-text (STT) data) representative of a voice input **156*a* received via the PMSA 110 and process the data to determine a user command (e.g., a user request or instruction). In some embodiments, at least one of the media content server 200, the PMSA server 202, and the voice interaction server 204** may be used to perform one or more functions corresponding to the determined user command.

A voice interaction server 204 may be used to recognize a voice command and perform steps to carry out the voice command. For example, a user may say "Ahoy computer, play a blues mix." The voice interaction server 204 is configured to receive the voice communication and process it. In some embodiments, the voice interaction server 204 is configured to receive data (e.g., speech-to-text (STT) data) representative of a voice input received via the PMSA 110 and process the data to determine a user command (e.g., a user request or instruction). Various types of speech recognition technology may be used to convert speech-to-text, such as natural language understanding (NLU), automatic speech recognition (ASR), and speech-to-text (STT) technology.

In an embodiment, the command processing application 121 and the on-device ASP 182 work together to receive an instruction, convert it to text, and produce an outcome. In a non-limiting example, the command processing application 121 performs all the functions to convert an instruction to text and sends an output to be carried out by the PMSA 110.

In some embodiments, the command confirmation application 127 functions to receive an instruction that includes a command and determine whether the output meets an audible threshold within a predetermined time.

In some embodiments, the in-cloud audio processing server 206 includes an audio reconstruction machine learning (ML) model 912, a processing device 282, a memory device 284, and a network access device 286. The processing device 282, the memory device 284, and the network access device 286 may be similar to the processing device 214, the memory device 216, and the network access device 218, respectively, which have each been previously described.

In an example implementation, generally, an edge device such as PMSA 110 receives a raw audio signal mixed with wind noise. The edge device (e.g., PMSA 110) performs a wind noise suppression operation on the raw audio signal that is mixed with the wind noise, to generate a noise suppressed audio signal. In turn, that noise suppressed audio signal is communicated to an in-cloud server such as in-cloud audio processing server 206 which can perform audio reconstruction on the noise suppressed audio signal. The output is thus a reconstructed noise suppressed audio signal. As explained below in more detail, whether the in-cloud server performs the audio reconstruction on the noise suppressed audio signal is conditioned on the extent of any wind. Further the audio reconstruction can include audio inpainting.

In some embodiments, the audio inpainting is particular to speech. Speech inpainting as used herein is context-based recovery of missing or severely degraded information in a time-frequency representation of natural speech. Audio reconstruction application 129 when executed by processing device 282 operates to perform speech reconstruction. In an example implementation, a neural network operates to perform speech inpainting to provide context-based retrieval of large portions of missing or severely degraded time-frequency representations of speech. In an example embodiment the fundamental frequency or F0 is reconstructed from its harmonics (2nd, 3rd, etc.). The fundamental frequency (i.e., F0) is the frequency at which vocal chords vibrate in voiced sounds. This frequency can be identified in the sound produced, which presents quasi-periodicity, the pitch period being the fundamental period of the signal (the inverse of the fundamental frequency). It should be understood that other frameworks for performing audio reconstruction can be used instead of the above described audio reconstruction method and still be within the scope of the invention.

In some embodiments, speech inpainting is used to perform a different function of removing information from an audio signal. For example, speech inpainting can be used to remove biometric information from an audio signal. In some embodiments, speech inpainting can also be used to perform additional noise suppression.

Figure 4:
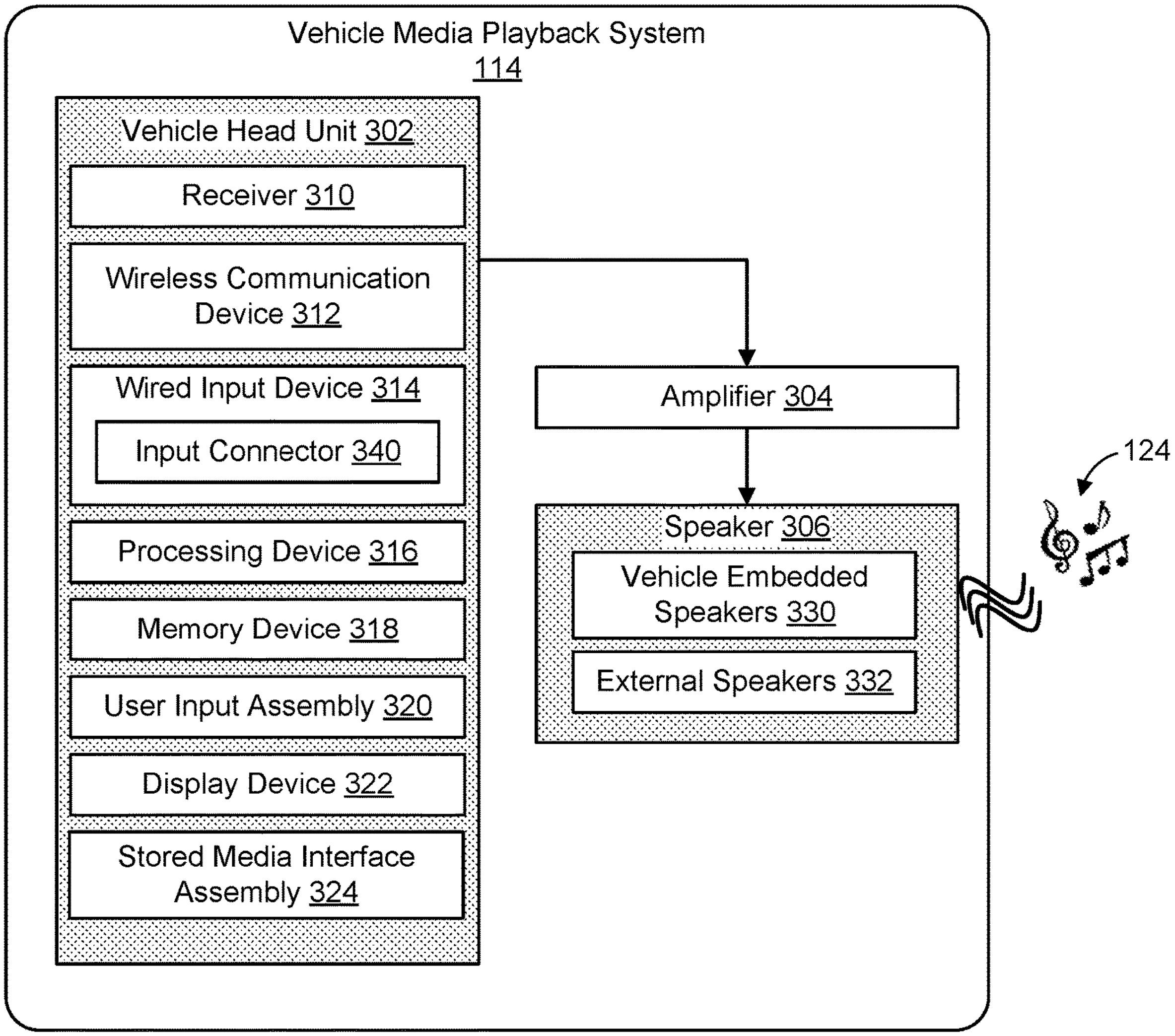
FIG. 4 is a block diagram of an exemplary embodiment of a vehicle media playback system.

FIG. 4 is a block diagram of an exemplary embodiment of the vehicle media playback system 114. In this example, the vehicle media playback system 114 includes a vehicle head unit 302, an amplifier 304, and a speaker 306.

The vehicle head unit 302 is configured to receive a user input and generate media content from various sources. In this example, the vehicle head unit 302 includes a receiver 310, a wireless communication device 312, a wired input device 314, a processing device 316, a memory device 318, a user input assembly 320, a display device 322, and a stored media interface assembly 324.

The receiver 310 operates to receive media content signals from various external sources. The received signals can then be used to generate media output by the vehicle media playback system 114. Some embodiments of the receiver 310 include one or more tuners for receiving radio signals such as FM or AM radio signals. Other embodiments of the receiver 310 include a receiver for receiving satellite radio signals and/or a receiver for receiving internet radio signals.

The wireless communication device 312 operates to communicate with other devices using wireless data signals. The wireless communication device 312 can include one or more of a Bluetooth® transceiver and a Wi-Fi® transceiver. The wireless data signal may comprise a media content signal such as an audio or video signal. In some embodiments, the wireless communication device 312 is used to enable the vehicle media playback system 114 to wirelessly communicate with the PMSA 110 and receive the media content signal 165 (FIG. 2) from the PMSA 110 via an in-vehicle wireless network. The in-vehicle wireless network between the PMSA 110 and the vehicle media playback system 114 can be configured similarly to communicate through the in-vehicle wireless data communication network 122 (FIG. 2).

The wired input device 314 provides an interface configured to receive a cable for providing media content and/or commands. The wired input device 314 includes an input connector 340 configured to receive a plug extending from a media playback device for transmitting a signal for media content. In some embodiments, the wired input device 314 can include an auxiliary input jack (AUX) for receiving a plug from a media playback device that transmits analog audio signals. The wired input device 314 can also include different or multiple input jacks for receiving plugs from media playback devices that transmit other types of analog or digital signals (e.g., USB, HDMI, Composite Video, YPbPr, DVI). In some embodiments, the wired input device 314 is also used to receive instructions from other devices.

In some embodiments, the wired input device 314 provides the input connector 340 (e.g., an AUX port) for receiving a connector extending from the PMSA 110. The media content signal 165 is then transmitted from the PMSA 110 to the vehicle media playback system 114 via, for example, a cable or wirelessly.

The processing device 316 operates to control various devices, components, and elements of the vehicle media playback system 114. The processing device 316 can be configured similar to the processing device 148 (FIG. 2) and, therefore, the description of the processing device 316 is omitted for brevity purposes.

In some embodiments, the processing device 316 operates to process the media content signal 165 received from the PMSA 110 and convert the media content signal 165 to a format readable by the vehicle media playback system 114 for playback.

The memory device 318 is configured to store data and instructions that are usable to control various devices, components, and elements of the vehicle media playback system 114. The memory device 318 can be configured similar to the memory device 150 (FIG. 2) and, therefore, the description of the memory device 318 is omitted for brevity purposes.

The user input assembly 320 includes one or more input devices for receiving user input from users for controlling the vehicle media playback system 114. In some embodiments, the user input assembly 320 includes multiple knobs, buttons, and other types of input controls for adjusting volume, selecting sources and content, and adjusting various output parameters. In some embodiments, the various input devices are disposed on or near a front surface of the vehicle head unit 302. The various input devices can also be disposed on the steering wheel of the vehicle or elsewhere. Additionally or alternatively, the user input assembly 320 can include one or more touch sensitive surfaces, which can be incorporated in the display device 322.

The display device 322 displays information. In some embodiments, the display device 322 includes a liquid crystal display (LCD) panel for displaying textual information about content and/or settings of the vehicle media playback system 114. The display device 322 can also include other types of display panels such as a light emitting diode (LED) panel. In some embodiments, the display device 322 can also display image or video content.

The stored media interface assembly 324 reads media content stored on a physical medium. In some embodiments, the stored media interface assembly 324 comprises one or more devices for reading media content from a physical medium such as a compact disc or cassette tape.

The amplifier 304 operates to amplify a signal received from the vehicle head unit 302 and transmits the amplified signal to the speaker 306. In this manner, the media output 124 can be played back at a greater volume. The amplifier 304 may include a power source to power the amplification.

The speaker 306 operates to produce an audio output (e.g., the media output 124) based on an electronic signal. The speaker 306 can include one or more vehicle embedded speakers 330 disposed at various locations within the vehicle 80. In some embodiments, separate signals are received for at least some of the speakers (e.g., to provide stereo or surround sound).

In other embodiments, the speaker 306 can include one or more external speakers 332 which are arranged within the vehicle 80. Users may bring one or more external speakers 332 into the vehicle 80 and connect the external speakers 332 to the vehicle head unit 302 using a wired interface or a wireless interface. In some embodiments, the external speakers 332 can be connected to the vehicle head unit 302 using Bluetooth®. Other wireless protocols can be used to connect the external speakers 332 to the vehicle head unit 302. In other embodiments, a wired connection (e.g., a cable) can be used to connect the external speakers 332 to the vehicle head unit 302. Examples of the wired connection include an analog or digital audio cable connection and a universal serial bus (USB) cable connection. The external speaker 332 can also include a mechanical apparatus for attachment to a structure of the vehicle.

FIG. 5 is a block diagram of an exemplary embodiment of the mobile computing device 118 of FIG. 2.

Similar to the PMSA 110, the mobile computing device 118 can also be used to play media content. For example, the mobile computing device 118 is configured to play media content that is provided (e.g., streamed or transmitted) by a system external to the mobile computing device 118, such as the media delivery system 112, another system, or a peer device. In other examples, the mobile computing device 118 operates to play media content stored locally on the mobile computing device 118. In yet other examples, the mobile computing device 118 operates to play media content that is stored locally as well as media content provided by other systems.

In some embodiments, the mobile computing device 118 is a handheld or portable entertainment device, smartphone, tablet, watch, wearable device, or any other type of computing device capable of playing media content. In other embodiments, the mobile computing device 118 is a laptop computer, desktop computer, television, gaming console, set-top box, network appliance, blue-ray or DVD player, media player, stereo, or radio.

As described herein, the mobile computing device 118 is distinguished from the PMSA 110 in various aspects. For example, unlike the PMSA 110, the mobile computing device 118 is not limited to playing media content, but configured for a wide range of functionalities in various situations and places. The mobile computing device 118 is capable of running a plurality of different software applications for different purposes. The mobile computing device 118 enables the user to freely start or stop activation of such individual software applications.

In at least some embodiments, the mobile computing device 118 includes a location-determining device 402, a display screen 404, a processing device 406, a memory device 408, a media content output device 410, and a network access device 412. Other embodiments may include additional, different, or fewer components. For example, some embodiments may include a recording device such as a microphone or camera that operates to record audio or video content.

The location-determining device 402 is a device that determines the location of the mobile computing device 118. In some embodiments, the location-determining device 402 uses one or more of Global Positioning System (GPS) technology (which may receive GPS signals), Global Navigation Satellite System (GLONASS), cellular triangulation technology, network-based location identification technology, Wi-Fi® positioning systems technology, and combinations thereof.

The display screen 404 is configured to display information. In addition, the display screen 404 is configured as a touch sensitive display and includes a user interface 420 for receiving a user input from a selector (e.g., a finger, stylus etc.) controlled by the user U. In some embodiments, therefore, the display screen 404 operates as both a display device and a user input device. The touch sensitive display screen 404 operates to detect inputs based on one or both of touches and near-touches. In some embodiments, the display screen 404 displays a graphical user interface for interacting with the mobile computing device 118. Other embodiments of the display screen 404 do not include a touch sensitive display screen. Some embodiments include a display device and one or more separate user interface devices. Further, some embodiments do not include a display device.

In some embodiments, the processing device 406 comprises one or more central processing units (CPU). In other embodiments, the processing device 406 additionally or alternatively includes one or more digital signal processors, field-programmable gate arrays, or other electronic circuits.

The memory device 408 operates to store data and instructions. In some embodiments, the memory device 408 stores instructions for a media playback engine 430. In yet other embodiments, the memory device 408 includes a command processing engine 125 that includes a sound processing engine 562 and a speech input engine 564.

The memory device 408 may be configured similarly to the memory device 150 (FIG. 2) and, therefore, the description of the memory device 408 is omitted for brevity purposes.

In some embodiments, the media playback engine 430 operates to retrieve one or more media content items that are either locally stored in the mobile computing device 118 or remotely stored in the media delivery system 112. In some embodiments, the media playback engine 430 is configured to send a request to the media delivery system 112 for media content items and receive information about such media content items for playback.

In embodiments the sound processing engine 562 is configured similarly to the on-device noise processor 180 and on-device ASP 182 described with reference to FIG. 2, and, therefore, the description of the sound processing engine 562 is omitted for brevity purposes.

Referring still to FIG. 5, the media content output device 410 operates to output media content. In some embodiments, the media content output device 410 generates a media output 450 for the user U. In some embodiments, the media content output device 410 includes one or more embedded speakers 452, which are incorporated in the mobile computing device 118. Therefore, the mobile computing device 118 can be used as a standalone device that generates the media output 450.

In addition, some embodiments of the mobile computing device 118 include an external speaker interface 454 as an alternative output of media content. The external speaker interface 454 is configured to connect the mobile computing device 118 to another system having one or more speakers, such as headphones, portal speaker assemblies, and the vehicle media playback system 114, so that the media output 450 is generated via the speakers of the other system external to the mobile computing device 118. Examples of the external speaker interface 454 include an audio output jack, a Bluetooth® transmitter, a display panel, and a video output jack. Other embodiments are possible as well. For example, the external speaker interface 454 is configured to transmit a signal through the audio output jack or Bluetooth® transmitter that can be used to reproduce an audio signal by a connected or paired device such as headphones or a speaker.

The network access device 412 operates to communicate with other computing devices over one or more networks, such as the network 116 and the in-vehicle wireless data communication network 122. Examples of the network access device 412 include wired network interfaces and wireless network interfaces. Wireless network interfaces includes infrared, Bluetooth® wireless technology, 802.11a/b/g/n/ac, and cellular or other radio frequency interfaces in at least some possible embodiments.

Figure 6:
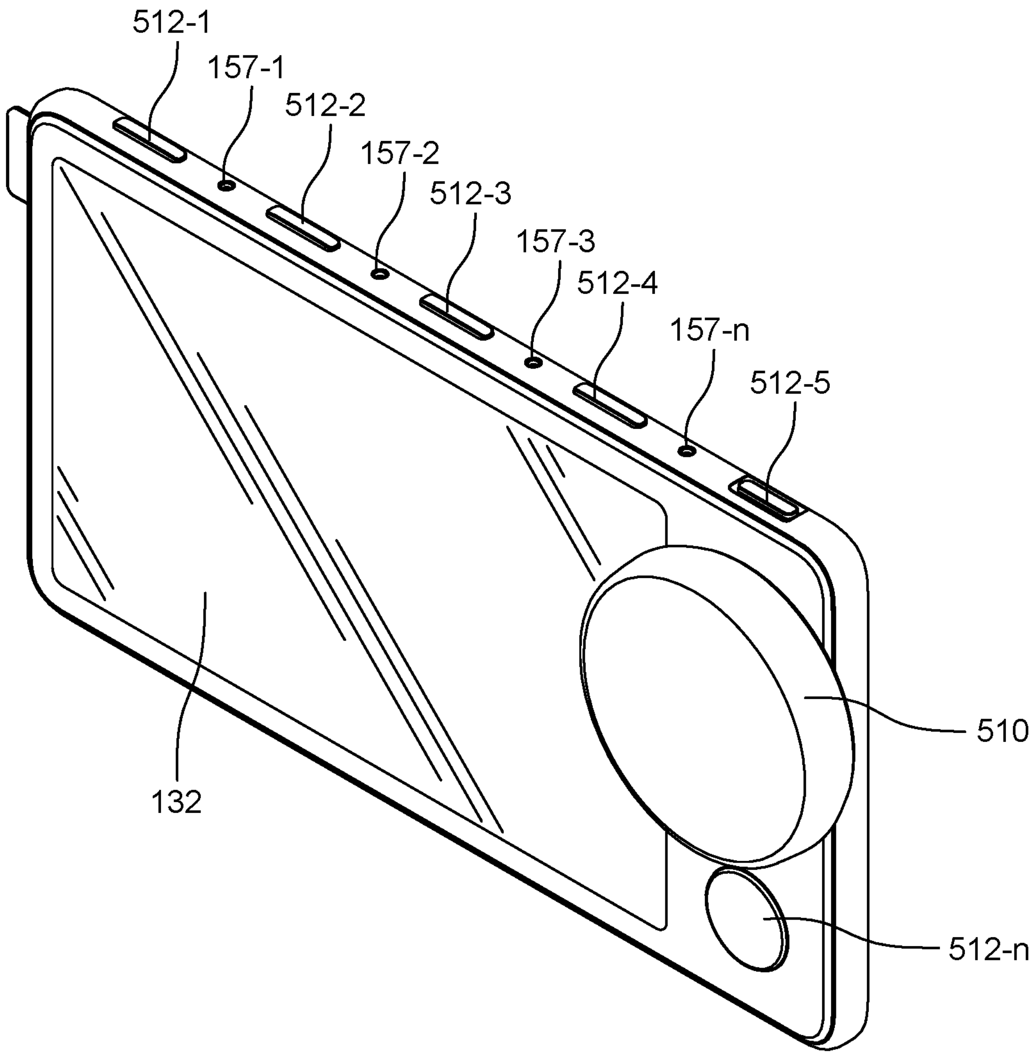
FIG. 6 schematically illustrates an exemplary embodiment of the PMSA.

FIG. 6 schematically illustrates an exemplary embodiment of the PMSA 110 of FIG. 1. As described herein, the PMSA 110 is sized to be relatively small so that the PMSA 110 can be easily mounted to a structure (e.g., a dashboard or head unit) of the vehicle 80 where the user can conveniently manipulate the PMSA 110. By way of example, the PMSA 110 is configured to be smaller than a typical mobile computing device, such as a smartphone. Further, the PMSA 110 provides a simplified user interface for controlling playback of media content. For example, the PMSA 110 has a limited set of physical control elements, such as a single rotary knob 510 and one or more physical buttons 512-1, 512-2, 512-3, 512-4, 512-5, . . . , 512-*n*, so that the user can easily control the PMSA 110 in the vehicle 80 (FIG. 1).

In addition, the PMSA 110 also includes the display device 132. In some embodiments, the display device 132 is arranged as a touch screen on PMSA 110. As described herein, in some embodiments, the display device 132 does not include a touch sensitive display screen, and is configured as a display device only. In other embodiments, however, the display device 132 can be configured to be touch sensitive and receive a user input through the display device 132 as well.

In some embodiments, the PMSA 110 can have one or more microphones 157-1, 157-2, 157-3, . . . , 157-*n* (individually and collectively referred to as microphone(s) 157 or microphone array 157) arranged within the same housing. In other embodiments, the microphone array 157 of the PMSA 110 can be communicatively coupled in a variety of now-known or future-known ways, e.g., via Bluetooth®, Wi-Fi®, near field communication (NFC), wired and the like. In addition, microphone(s) can be arranged in now known or future developed microphone array geometries, such as a circular array geometry, a square array geometry, a rectangular planar array geometry, and the like. In addition the microphones can be arranged in different locations on the PMSA 110, such as facing up, facing down, on the one or more sides, in the front, in the back, or any combination of any of the foregoing.

FIG. 7 is a block diagram of an exemplary embodiment of the on-device noise processor 180 and on-device audio signal processor 182 of PMSA 110. The on-device noise processor 180 includes a wind detector 700 and an on-device wind noise suppressor ML model 702. In some embodiments on-device noise processor 180 perform various noise reduction functions to reduce noise in the audio input other than wind noise.

Wind detector 700 operates to detect wind noise level (WNL). Wind detector 700 can be implemented to detect WNL according to now known or future developed methods for detecting WNL. For example, wind noise can be detected based on a signal from a single microphone or based on two or more microphones of microphone array 157. Noise caused by air moving past the microphone or microphones, that is "wind", can have a characteristic noise pattern or can reach an amplitude above a certain threshold such that the noise is deemed "wind noise". Wind noise level can be detected based on comparing a value of a cross-correlation function against a predetermined threshold. If that value is lower than the threshold, wind noise is detected. Otherwise, the noise from wind can be assumed to be of very low amplitude or practically absent and, therefore, not deemed to be "wind noise".

Another method for detecting wind noise is performed by using frequency cues and/or correlation features between two or more microphone signals of microphone array 157. A low correlation/coherence of the output signals of the two microphones can be an indicator of presence of wind noise.

Other implementations exploit features of a beamformed signal to detect wind noise. For example by providing signals from two microphones of microphone array 157 to wind noise detector 700 where beamforming is applied that results in a single beamformed signal. The resulting beamformed signal is then used to determine a wind noise level estimation present at the two microphones.

In yet another example embodiment, the signals from microphone array 157 can be applied to the wind noise detector 700 to determine a wind noise level by applying a low pass filter to the audio input received by the microphone array 157. In turn, a non-uniformity of the signals across the microphones of microphone array 157 may be detected to infer that there is wind present in the audio input, and to determine a wind speed based on the energy (e.g., low frequency energy) and amplitude across time. Alternatively, a Bayesian statistical estimation scheme may be used where the probability ratio between the probability that there is wind and the probability of a windless condition is computed. For the latter purpose, it is assumed that both conditions (i.e., wind vs. no wind) arise with a Gaussian probability distribution having the same variance but different mean values.

In some embodiments, both training data and fine tuning can be used to estimate beforehand the variance and the two mean values in order to achieve an appropriate estimation of the wind noise level.

WNL can be correlated to wind speed. For example WNL can be proportional to the square of wind speed (i.e., $y \propto x^2$; e.g., $WNL=kx^2$, where x is wind speed and k is a constant). In some embodiments, the translation from WNL to wind speed can be determined by heuristic observations. Thus the presence of wind can be detected and the speed of the wind can be inferred based on the audio signals captured by a microphone (or multiple microphones).

The wind detector 700 also operates to control whether wind noise suppression is performed. Wind detector 700 further operates to control whether additional in-cloud audio reconstruction is performed. Accordingly, PMSA 110 controls whether to perform noise suppression on-device (e.g., on PMSA 110) and audio reconstruction in-cloud (e.g., on media delivery system 112). As explained in more detail below, in-cloud audio reconstruction is a process that performs audio reconstruction of an audio input having voice input that has been degraded (e.g., as a result of the on-device noise suppression processing) and needs to be audio processed before it can be analyzed by an audio speech recognition engine.

In some embodiments, wind detector 700 further operates to control whether to perform additional noise suppression in-cloud (e.g., on media delivery system 112). In some embodiments, a wind noise suppression framework performed by the PMSA 110 is different from the wind noise suppression framework performed in-cloud, such as on the media delivery system 112.

In some embodiments audio reconstruction is performed in-cloud, in some embodiments noise suppression is performed in-cloud, and in yet other embodiments both audio reconstruction and noise suppression are performed in-cloud.

In an example implementation, wind detector 700 determines whether the wind noise level (WNL) measured by the microphones 157-1, 157-2, 157-3, . . . , 157-*n* (FIG. 2) is below a first threshold ($T_1$). For example if the first threshold $T_1$ is in terms of WNL, then the test is whether $WNL<T_1$. If, for example, $WNL=kx^2$, where x is wind speed and k is a constant, e.g., k=1, and, WNL<4 then a WNL correlates to a wind speed of 2 m/s (i.e., x=2). Thus, if the first threshold $T_1$ is in terms of wind speed, the test is whether wind speed<2 m/s). When the wind detector 700 determines that the WNL measured by the microphones 157-1, 157-2, 157-3, . . . , 157-*n* is below the first predetermined level ($T_1$), then no further action is performed to suppress the wind noise and on-device audio signal processing is performed by, for example, on-device audio signal processor 182. If the WNL measured by the microphones 157-1, 157-2, 157-3, . . . , **157-*n* is between the first threshold and a second threshold ($T_2$), then an on-device wind noise suppressor ML model 702** performs a wind noise suppression on the audio input. For example, if the first threshold $T_1$ and second threshold $T_2$ are in terms of WNL then the test in this example embodiment is $T_1 \leq WNL \leq T_2$ (e.g., where $T_1=4$, $T_2=16$, and k=1, then in terms of wind speed the test correlates to 2 m/s≤wind speed≤4 m/s).

In an example implementation, the second threshold is greater than the first threshold. In some embodiments, the wind noise suppression process is applied to the signals measured by a subset of the microphones 157-1, 157-2, 157-3, . . . , **157-*n***.

If wind detector 700 determines that the WNL measured by the microphones 157-1, 157-2, 157-3, . . . , **157-*n* is greater than the second threshold $T_2$, then the on-device noise processor 180 processes the audio input by applying it to on-device wind noise suppressor ML model 702 thus generating in on-device processed audio input, and the on-device noise processor 180 causes the on-device processed audio input to be communicated to an in-cloud audio processing server 206 to be further processed by an audio reconstruction application 129. The audio reconstruction application 129 of in-cloud audio processing server 206, in turn, performs post processing audio reconstruction by applying an audio reconstruction ML model 912** to the on-device processed audio input. In an example implementation, the second threshold is greater than the first threshold.

Those skilled in the art will appreciate that a microphone converts sound ways to audio signals, which are then converted to digital audio data and sent or inputted to sound capture device 162 as described above. The audio signals (typically AC voltages) are converted to digital data to be processed as described herein. Further, in some embodiments, the measurement is the average of the signals detected by the microphones. In some embodiments, the measurement is the average of a subset of the signals detected by the microphones.

In some embodiments, on-device audio signal processor 182 includes a beamforming network 706, a wake-word detector 710, and an on-device audio speech recognition engine 712.

Beamforming network 706 operates to perform real-time pickup of acoustic signals containing the audio input 156 that are received from the one or more microphones 157-1, 157-2, 157-3, . . . , **157-*n*. The beamforming network 706 can be controlled by the on-device noise processor 180 to combine the audio input received from one or more of the microphones 157-1, 157-2, 157-3, . . . , 157-*n*. In addition (or alternatively) beamforming network 706 can be controlled by the on-device ASP 182 to combine the audio input received from one or more of the microphones 157-1, 157-2, 157-3, . . . , 157-*n***.

In an example embodiment, the on-device wind noise suppressor ML model 702 is pretrained with samples of wind noise and samples of clean speech data set. The output of the neural network is the audio input with at least some of the wind noise removed.

In some embodiments, the data sets that are used to train the on-device noise suppressor ML model 702 neural networks are curated data sets, curated specific for the domain of vehicle wind noise and utterances used for commanding personal media streaming appliances as discussed herein. In some examples, the clean speech data set is a data set of real utterances. In some examples, the wind noise data set are real wind noise samples. In some embodiments, a data set for training the neural network is synthetically generated. For example synthetic wind noise and/or synthetic clean speech data sets can be generated to be used to train the neural network. In some embodiments, wind noise from user vehicles can be used to train the neural network during operation of PMSA 110 to train the neural network model on user specific vehicles. The clean speech data set and the wind noise data sets are mixed to create a noisy data set (also referred to as a corrupt data set). In turn, the clean speech data set, the wind noise data set, and the noisy data set are used to train the on-device noise suppression neural network (e.g., a wind noise suppressor ML model 702 that is on-device) and the in-cloud audio reconstruction framework (e.g., an audio reconstruction ML model 912 that is in-cloud). Similarly noise suppression neural network.

On-device wind noise suppressor ML model 702 is arranged to store a set of neural network weights (sometimes simply referred to as weights). The on-device wind noise suppressor ML model 702 of PMSA 110 is trained with the set of weights that is then used to perform noise suppression on the audio input. The weights are also sometimes referred to as trainable parameters of a neural network.

Generally, the on-device audio signal processor 182 functions to receive a voice input **156*a* in the form of an utterance from a user and process the utterance to produce a desired outcome. In some embodiments, PMSA 110 also includes an on-device ASP 182 which functions to perform on-device signal processing on audio input 156 received by microphone(s) 157. On-device ASP 182 includes a beamforming network 706, a wake-word detector 710 and an on-device audio speech recognition engine 712**.

The on-device ASP 182 parses the utterance from a user into three parts: an activation trigger portion (also referred to as a wake-word portion), a command portion, and a parameter portion.

The wake-word detector 710 (also sometimes referred to as a speech trigger activation engine) receives the wake-word (also sometimes referred to as an activation trigger portion). For illustrative purposes, "ahoy computer" is used as the wake-word. The wake-word is used by the wake-word detector 710 to notify to the PMSA 110 to continue listening to the user or to begin listening to the user. If an instruction is made by the user, but it does not start with the predetermined wake-word, the PMSA 110 does not listen to the user and ignores any further portion of the utterance. This prevents the PMSA 110 from listening when a user is not attempting to issue a command.

Where user data is used, it can be handled according to a defined user privacy policy and can be used to the extent allowed by the user. The audio of the user or of others within the vehicle 80 the PMSA 110 can be handled in an anonymized matter so as to not learn of the details of users generally or specifically.

In an alternative embodiment, a wake-word is not required. Instead, a user may 'unlock' or use another type of 'wake signal' to activate the on-device audio signal processor 180. For example, a user may press a button on the PMSA 110, which has the same effect as saying a wake-word.

In some embodiments, after the wake-word is processed, on-device speech recognition engine 712 identifies the command portion of the utterance. The command portion identifies intent of the user. For example, a user may say "ahoy computer, play a blues mix." The word "play" is identified as the command, and the on-device speech recognition engine 712 processes the request with regard to the next portion of the phrase as described below. Other command portions may include the terms "add," "skip," "delete," etc. In further embodiments, the on-device speech recognition engine 712 may infer from an instruction, the user's intent, even if no command portion phrase is said.

The on-device speech recognition engine 712 identifies the parameter portion of the instruction. The parameter portion identifies the portion of the instruction to which the command is applied. For example, in the phrase, "ahoy computer, play a blues mix," the last portion "a blues mix" is the parameter portion.

Figure 9:
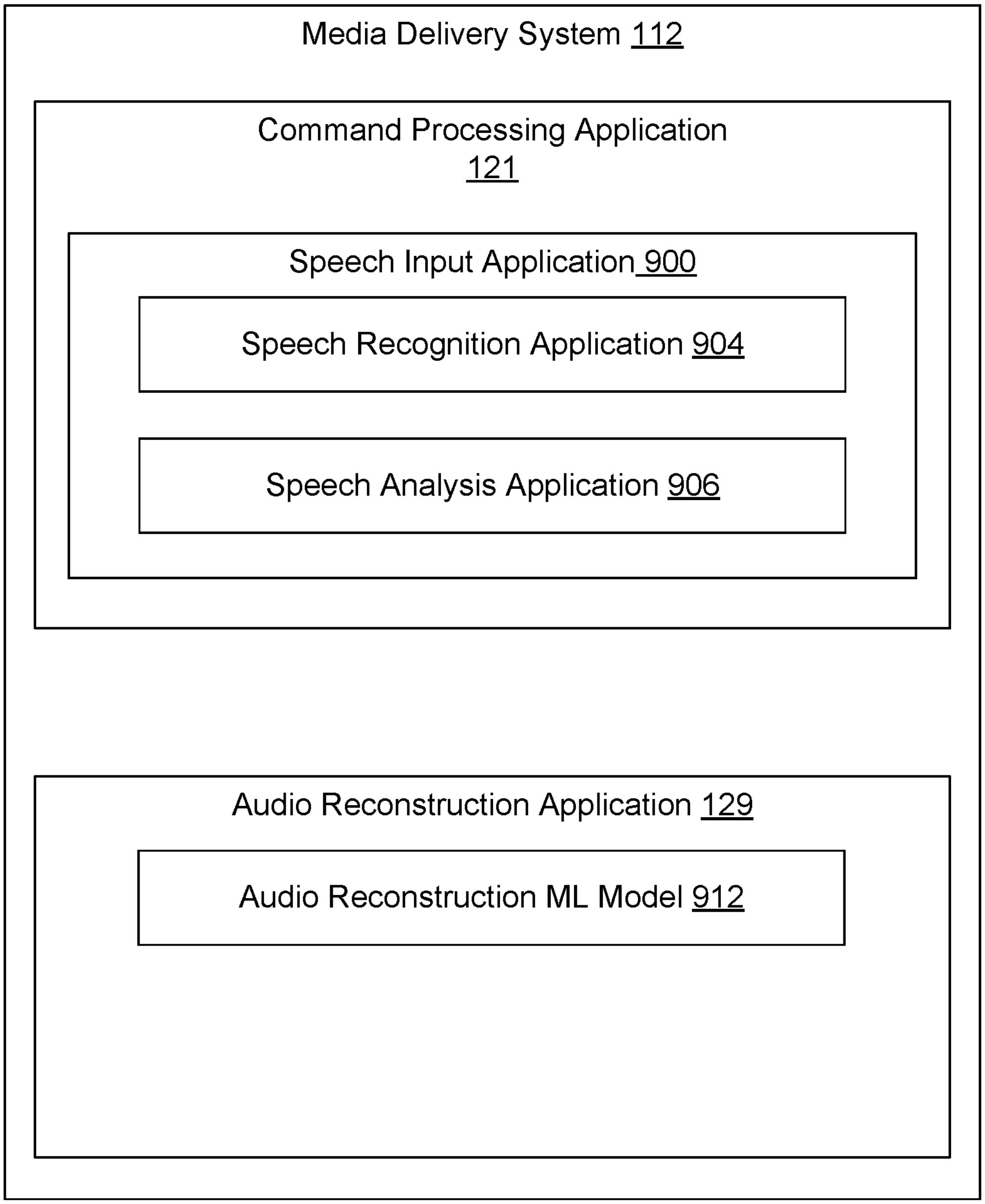
FIG. 9 is a block diagram of an exemplary embodiment of the command processing application and audio reconstruction ML model of the media delivery system.

FIG. 9 is a block diagram of an exemplary embodiment of the command processing application 121 and audio reconstruction application 129 of the media delivery system 112. In this example, the command processing application 121 includes a speech input application 900. The speech input application 900 includes a speech recognition application 904 and a speech analysis application 906.

In example embodiments, the on-device ASP 182 of the PMSA 110 works in conjunction with the command processing application 121 and audio reconstruction application 129 of the media delivery system 112 to analyze and process the audio signals output by the PMSA 110 and convert an instruction to text.

In an example method, the wake-word detector 710 of the PMSA 110 detects a wake-word and performs audio processing and noise suppression as describe above in connection with on-device noise processor 180 and on-device audio signal processor 182 of PMSA 110. If the PMSA 110 (e.g., the on-device noise processor 180) determines in-cloud audio reconstruction is necessary, then PMSA 110 (e.g., on-device noise processor 180) communicates an instruction to the media delivery system 112 indicating that audio reconstruction is required. If command processing application 121 does not receive an instruction to perform audio reconstruction on the on-device processed audio signal, speech recognition application 904 and speech analysis application 906 of the command processing application 121 process the command and parameter portion of the audio signal communicated by PMSA 110 (e.g., on-device processed audio).

To support wind noise levels above a predetermined threshold, the processing of the on-device processed audio input is handed off to a post processing stage running in-cloud. In some embodiments, this is accomplished by on-device noise processor 180 transmitting an instruction to the audio reconstruction application 129. The post processing stage is, in turn, performed by audio reconstruction application 129. Audio reconstruction application 129 executes a second, pretrained neural network.

Once the utterance contained in voice input 156*a* is processed by the audio reconstruction application 129 and command processing application 121, media delivery system 112 operates to deliver media content to the PMSA 110 and, in turn, PMSA 110 delivers the media content to the vehicle media playback system 114 to play in the vehicle 80 in accordance with the command portion and parameter portion of the utterance contained in voice input 156*a*.

Figure 10:
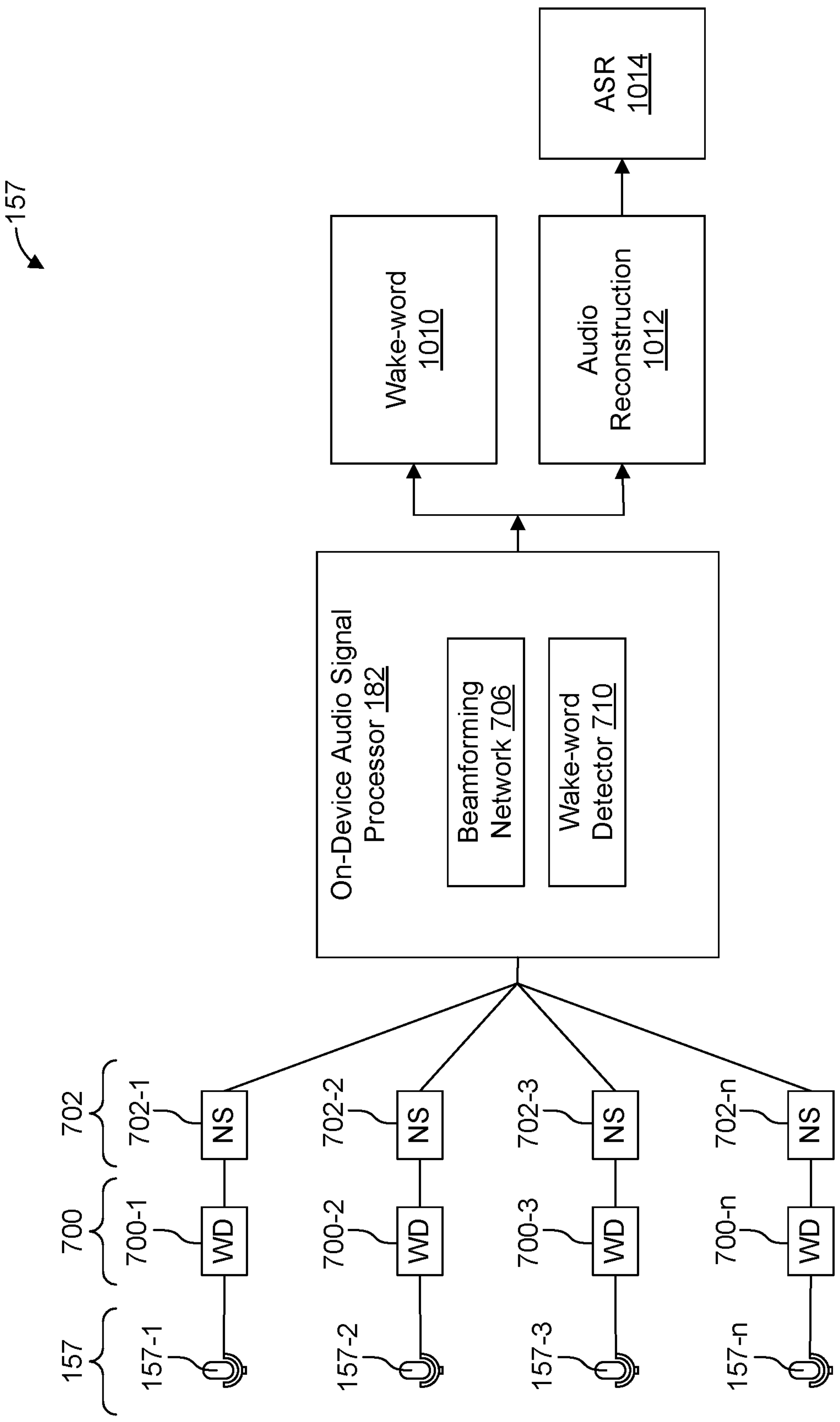
FIG. 10 is a system flow diagram of a wind suppression process in accordance with an example embodiment.

FIG. 10 is a system flow diagram of a wind suppression process in accordance with an example embodiment. In this example implementation, the PMSA 110 includes n microphones 157-1, 157-2, 157-3, . . . , 157-*n*, where n is an integer. The microphones 157-1, 157-2, 157-3, . . . , 157-*n* are used to detect audio input at each microphone 157-1, 157-2, 157-3, . . . , 157-*n* independently.

In an example use case, the audio input received by microphones 157-1, 157-2, 157-3, . . . , 157-*n* is measured for wind noise and voice input. Particularly, the wind noise is measured by a wind detector 700. The unit of measurement is wind noise level (WNL). In some embodiments, a wind detector 700-1, 700-2, 700-3, . . . , 700-*n* can operate to measure the WNL for each microphone 157-1, 157-2, 157-3, . . . , 157-*n* substantially simultaneously. Accordingly, wind detectors 700-1, 700-2, 700-3, . . . , 700-*n* can be a single wind detector 700 measuring each microphone in microphone array 157 in sequence or multiple instances of the same wind detector 700 can operate in parallel. In either case, as each microphone receives audio input independently, the wind noise for each microphone is detected. As explained above, wind noise level correlates to wind speed.

It should be understood that wind noise can be detected using any now known or future developed mechanism for electronically detecting wind noise. In an example embodiment, audio signals at frequencies and amplitudes associated with wind noise are measured. In turn, the wind noise level corresponding to the wind noise is determined from the frequencies and amplitudes of the audio signals. The wind noise level corresponds, at least in part to a wind speed.

As explained below in more detail, if the wind detector does not indicate the need for wind suppression, the audio input received by each the microphone 157-1, 157-2, 157-3, . . . , 157-*n* is processed by a beamforming network 706 and a wake-word detector 710. Beamforming network 706 performs beamforming by, for example, filtering the microphone signals received from one or more microphones 157-1, 157-2, 157-3, . . . , 157-*n* and combining the outputs to extract (e.g., by constructive combining) a desired signal and reject (by destructive combining) interfering signals according to their spatial location.

In some embodiments, an acoustic echo canceler can be included to perform echo suppression and cancellation commonly referred to as acoustic echo suppression (AES) and acoustic echo cancellation (AEC). Such an acoustic echo canceler, if implemented, can be depicted in FIG. 7 and FIG. 10 as part of the on-device audio signal processor 182. An AEC reference signal (also not shown) would be input to the acoustic echo canceler to perform such echo suppression and cancellation.

Wake-word detector 710 attempts to detect a wake-word in the voice input portion of the audio input received from one or more of the microphones 157-1, 157-2, 157-3, . . . , 157-*n*. If a wake-word 1010 has been detected it is transmitted (e.g., in the form of a wake-word identifier) along with the remainder of the voice input to media delivery system 112 for further processing. As mentioned above, in some embodiments, the on-device audio signal processor 182 of PMSA 110 can execute certain commands portions such as "add," "skip," "delete," etc.

Referring also to FIG. 8, in some embodiments a command portion 820 and/or parameter portion 830 of an utterance contained in a voice input 156*a* may be applied to audio sound recognition and/or natural language processing to be interpreted and processed. Such commands and parameters are communicated along with the activation trigger portion of the utterance (e.g., wake-word 1010) to media delivery system 112 for such processing. The PMSA 110 and media delivery system 112, in turn, will cooperate to execute one or more services in response to the command portion 820 and parameter portion 830 of the utterance contained in voice input 156*a*.

PMSA 110 is also configured to perform further processing to account for wind noise and if necessary media delivery system 112 performs yet further processing for the purpose of recognizing the command portion 820 and parameter portion 830 of a voice input 156*a*. In an example embodiment, when the audio signal processed by on-device noise processor 180 determines that audio reconstruction is necessary, then the on-device audio signal processor 182 provides an instruction to be communicated to an audio reconstruction application 129 to perform audio reconstruction as shown in block 1012. In turn, audio sound recognition is performed on the reconstructed signal as shown in block 1014.

As described below in more detail with reference to FIG. 11, if a determination is made by a wind detector 700-1, 700-2, 700-3, . . . , 700-*n* that the wind noise exceeds a predetermined threshold, then wind suppression is performed using the on-device wind noise suppressor ML model 702. When the wind noise exceeds another predetermined threshold then in addition to such on-device noise suppression, the on-device noise processor 180 causes the output of the wind suppression process performed by the on-device wind noise processor 180 to be communicated to audio reconstruction application 129 to be applied to audio reconstruction ML model 912 to reconstruct the on-device processed audio input. In some embodiments the audio input is communicated to audio reconstruction application 129 along with the output of the wind suppression process. In turn, the command processing application 121 of media delivery system 112 performs any necessary audio sound recognition to process the reconstructed utterance (e.g., reconstructed command portion and/or reconstructed parameter portion).

The on-device wind noise suppression performed by on-device noise processor 180 may generate distortion artifacts that are in turn transmitted with the processed input audio to audio reconstruction application 129. The in-cloud audio processing restores the corrupted audio file including such distortion artifacts.

Figure 11:
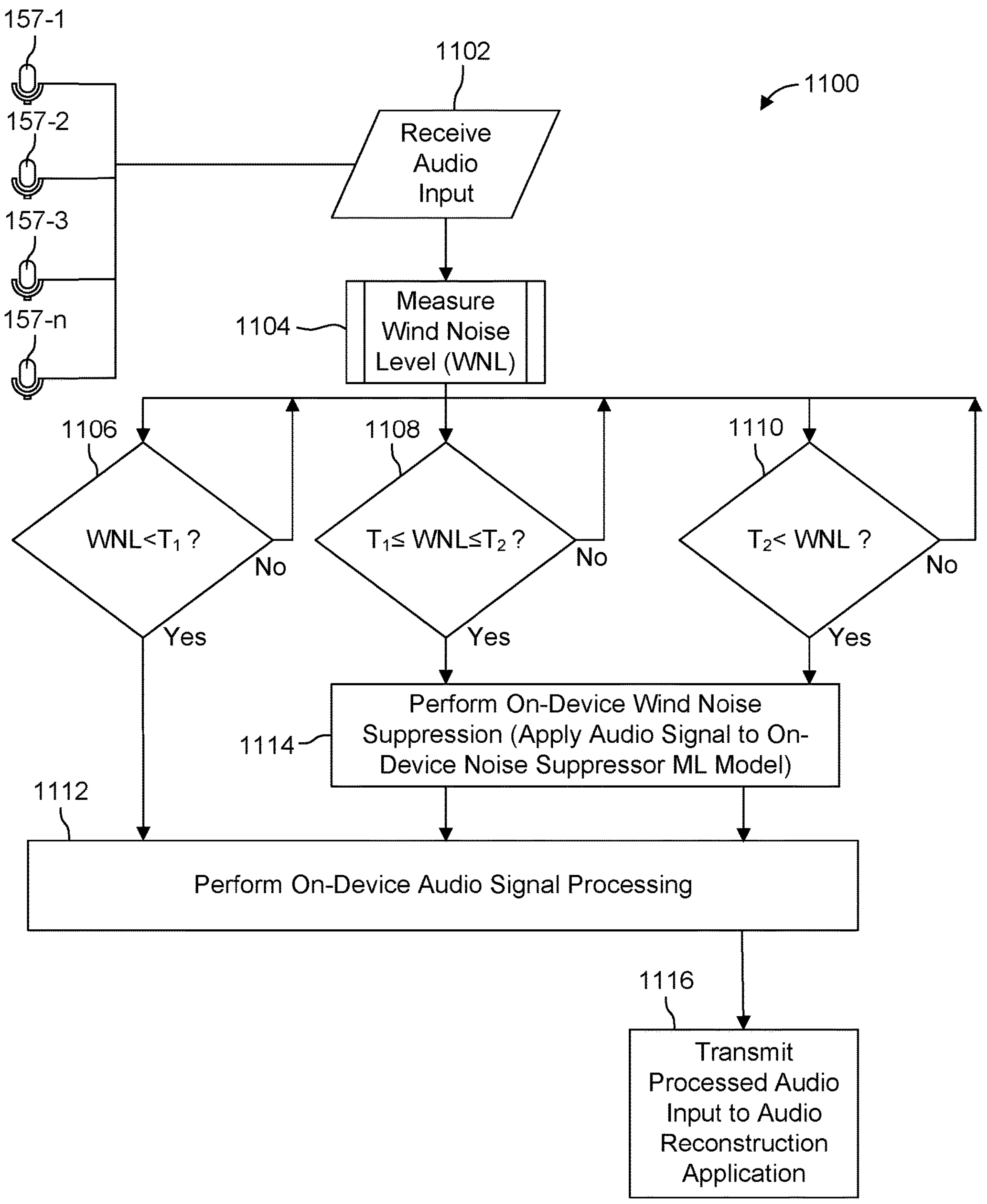
FIG. 11 is a flow diagram of a side chain control process based on wind noise in accordance with an example embodiment.

FIG. 11 is a flow diagram of a side chain control process 1100 based on wind noise in accordance with an example embodiment. The process can be performed for audio input received at each microphone 157-1, 157-2, 157-3, . . . , 157-*n*. Generally wind detector 700 operating on PMSA 110 executes a wind detection algorithm. In some embodiments, the wind detector 700 operates as a side chain for one specific use, to measure wind noise level (WNL). The wind detector 700 controls whether wind noise suppression is necessary and, if so, whether the wind noise suppression is performed solely on-device, or both on-device and in-cloud. The on-device wind noise suppression algorithm is different than the in-cloud wind noise suppression algorithm.

Advantageously, having the wind detector 700 execute the wind detection algorithm in parallel with other processes optimizes the PMSA 110 by enabling it to control on-device wind noise suppression that requires fewer computations and to control whether in-cloud wind noise suppression is necessary, where the in-cloud noise suppression requires larger computations.

At block 1102, audio input is received by one or more microphones 157-1, 157-2, 157-3, . . . , 157-*n*. At block 1104, a wind noise level (WNL) measurement is performed on the audio received from each microphone 157-1, 157-2, 157-3, . . . , 157-*n*. Wind noise level correlates to wind speed. Accordingly, it should be understood that a wind speed measurement can be made in place of a wind noise level measurement. A determination is made at block 1106 as to whether the wind noise level (WNL) measured by the microphones 157-1, 157-2, 157-3, . . . , 157-*n* is below a first threshold ($T_1$) (e.g., WNL<4 or wind speed<2 m/s). If a determination is made at block 1106 that the WNL for at least one of the microphones is below the first predetermined level ($T_1$), then no further action is performed to suppress the wind noise and the normal on-device audio signal processing is performed, as shown in block 1112 (e.g., acoustic echo cancelation, and, in some embodiments, on-device audio speech recognition).

In an example implementation, the on-device noise processor 180 executing the wind detector 700 performs no further action and the on-device ASP 182 performs audio signal processing on the audio input as described above. At block 1108 a determination is made as to whether the WNL measured by at least one of the microphones is between the first threshold and a second threshold (e.g., 4≤WNL≤16; which in terms of wind speed is 2 m/s≤wind speed≤4 m/s). If a determination is made at block 1108 that the WNL measured by at least one of the microphones is between the first threshold and a second threshold, then the audio input is processed on-device by performing wind noise suppression on the audio input on-device. This is performed by on-device noise processor 180 applying the audio input to an on-device wind noise suppressor ML model. In an example implementation, the second threshold is greater than the first threshold.

In some embodiments, the wind noise suppression process is applied to the signals to a subset of the microphones 157-1, 157-2, 157-3, . . . , 157-*n*.

At block 1110, a determination is made as to whether the WNL measure by a microphone (or an array of microphones) is greater than the second threshold (e.g., 16<WNL, which correlates in terms of wind speed to, for example, to 4 m/s<wind speed). If a determination is made at block 1110 that the WNL measured by a microphone (or array of microphones) is greater than the second threshold, then the on-device noise processor 180 applies the audio input to the on-device wind noise suppressor ML model as shown in block 1114 and the on-device noise processor 180 causes the processed audio input to be communicated to an in-cloud post processing audio reconstruction system to perform post processing audio reconstruction, as shown in block 1116. In turn, as described above, the output of the post processing audio reconstruction system is provided to the audio input recognition system of media delivery system 112 to perform audio signal recognition to interpret the reconstructed command portion and parameter portion of a voice input portion received by a microphone in microphone array 157 of PMSA 110.

In some embodiments, the tests can be in terms of wind speed instead of WNL.

As explained above PMSA 110 also can include an beamforming network 706 arranged for real-time pickup of acoustic signals containing the audio input 156 that are received from the one or more microphones 157-1, 157-2, 157-3, . . . , 157-*n*. If a determination is made that the audio input processed by the on-device noise processor 180 needs to be further processed in-cloud by the audio reconstruction application 129, then the output of the beamforming network 706 containing on-device processed command portion and on-device processed parameter portion is transmitted to the audio reconstruction model 129 to apply the on-device processed command portion and on-device processed parameter portion to the audio reconstruction machine learning model 912.

In an example embodiment, the on-device wind noise suppression that is performed in block 1114 is performed by using a now known or future developed wind noise suppression algorithm. In some embodiments, the wind noise suppression algorithm is based on machine learning (e.g., based on a supervised learning framework). Audio from the one or more microphones 157-1, 157-2, 157-3, . . . , **157-*n*** is run through a neural network that has been pretrained with samples of wind noise and samples of clean speech data set. The output of the neural network is the audio input with at least some of the wind noise removed.

In some embodiments, the data sets that are used to train the neural networks are curated data sets, curated specific for the domain of vehicle wind noise and utterances used for commanding personal media streaming appliances as discussed herein. In some examples, the clean speech data set is a data set of real utterances. In some examples, the wind noise data set are real wind noise samples. In some embodiments, a data set for training the neural network is synthetically generated. For example synthetic wind noise and/or synthetic clean speech data sets can be generated to be used to train the neural network. In some embodiments, wind noise from user vehicles can be used to train the neural network during operation of PMSA 110 to train the neural network model on user specific vehicles. The clean speech data set and the wind noise data sets are mixed to create a noisy data set (also referred to as a corrupt data set). In turn, the clean speech data set, the wind noise data set, and the noisy data set are used to train the on-device noise suppression neural network and the in-cloud noise suppression neural network.

The output of the training is a set of neural network weights (also referred to sometimes simply as weights) that are stored on PMSA 110 to enable the PMSA 110 to be used by a neural network model embedded into PMSA 110. The weights are also sometimes referred to as trainable parameters of a neural network. The trained neural network model is then used to perform noise suppression on the audio input as shown in block 1114.

The on-device wind noise suppression performed in block 1114 has limitations. In some embodiments, the on-device wind noise suppression cannot suppress wind noise over the first threshold ($T_1$) (e.g., wind speed<2 m/s). As the wind noise level increases, where the on-device wind noise suppression algorithm cannot effectively remove the wind noise from the audio input. In some cases, the on-device wind noise suppression algorithm also causes the processed audio input to contain artifacts in the form of gaps in the audio input which distorted the original audio input. As a result an audio speech recognition processor will not be able to confidently recognize the voice input portion of the audio input. To support higher wind noise levels, the processing is handed off to a post processing stage running in-cloud. The post processing stage executes a second, pretrained neural network. The second pretrained neural network is run in-cloud because it requires relatively more computing power (higher CPU complexity) than the on-device wind noise suppression neural network algorithm performed by PMSA 110.

In an example implementation, the audio reconstruction ML model 912 is trained to perform speech inpainting to provide context-based retrieval of large portions of missing or severely degraded time-frequency representations of speech. In an example embodiment the fundamental frequency or F0 is reconstructed from its harmonics (2nd, 3rd, etc.). The fundamental frequency (i.e., F0) is the frequency at which vocal chords vibrate in voiced sounds. This frequency can be identified in the sound produced, which presents quasi-periodicity, the pitch period being the fundamental period of the signal (the inverse of the fundamental frequency). It should be understood that other frameworks for performing audio reconstruction can be used instead of the above described audio reconstruction method and still be within the scope of the invention.

In some embodiments, the audio input received by the microphones array is distorted by the noise suppression process performed by the apparatus (e.g., the edge device). In some embodiments, the audio input is distorted as a result of the wind noise. And in yet some embodiments, the audio input is distorted as a result of both the wind noise and the noise suppression process performed by the apparatus.

Wind noise and road noise are prominent on the low frequency range (0-1000 Hz) of sound which can heavily mask a fundamental frequency of a human (100-400 Hz). Consequently, typical ASR systems fail to recognize an utterance and the WER is relatively high. In the telephony and/or VoIP industry, for example, it is common to use a high pass filter (~500 Hz) to filter such noises knowing that the human brain will reconstruct the fundamental frequency instinctively, without much effort, and understand what was said. Unfortunately, typical ASR systems are not able to do so. Advantageously, the in-painting as implemented in the example embodiments described herein operates as a pre-ASR-processing step to reconstruct the fundamental frequency of the voice to reduce the ASR's WER.

In some embodiments, the noise suppression is performed on a microphone by microphone basis.

Various operations and processes described herein can be performed by the cooperation of two or more devices, systems, processes, or combinations thereof.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

The invention claimed is:

1. An apparatus for processing noise, comprising:

one or more or more computing devices located remote from a cloud computing environment enabled to perform an audio reconstruction process in-cloud, communicatively coupled to a microphone array, and configured to:

operate as an edge device to control data flow at a boundary between two networks;

measure a noise level representative of a noise at the microphone array using an audio input detected by the microphone array; and determine based on the noise level, whether to perform either (i) a noise suppression process on the audio input by the one or more computing devices to suppress the noise thereby generating a noise suppressed audio input, or (ii) the noise suppression process on the audio input by the one or more computing devices to suppress the noise thereby generating a noise suppressed audio input and an audio reconstruction process in-cloud on the noise suppressed audio input thereby generating a reconstructed noise suppressed audio signal.

2. The apparatus according to claim 1, further comprising: an on-device audio signal processor configured to perform, in a case where the noise level is below a first threshold, signal processing on the audio input.

3. The apparatus according to claim 1, further comprising: an on-device noise processor configured to perform, in a case where the noise level is above a first threshold, a noise suppression process on the audio input.

4. The apparatus according to claim 1, further comprising: an on-device noise processor configured to, in a case where the noise level is above a second threshold:

perform a noise suppression process on the audio input, and transmit to an in-cloud audio processing server an instruction causing the in-cloud audio processing server to perform an audio reconstruction process on an output of the noise suppression process.

5. The apparatus according to claim 1, further comprising: a command confirmation engine configured to:

receive an indication of an inability to suppress the noise level; and communicate through an interface a message indicating the inability to suppress the noise.

6. The apparatus according to claim 1, the two or more computing devices further configured to:

measure, from the audio input, audio signals at frequencies and amplitudes associated with noise; and determine from the frequencies and amplitudes of the audio signals the noise level corresponding to the noise.

7. A method for processing an audio input, comprising:

receiving, from a microphone array, an audio input;

measuring, using the audio input, a noise level corresponding to a noise; and determining, based on the noise level, whether to perform either (i) a noise suppression process on the audio input on an apparatus operating as an edge device to suppress the noise thereby generating a noise suppressed audio input, or (ii) the noise suppression process on the audio input on the apparatus to suppress the noise thereby generating a noise suppressed audio input and an audio reconstruction process in-cloud on the noise suppressed audio input thereby generating a reconstructed noise suppressed audio signal, and wherein the edge device controls data flow at a boundary between two networks and is located remote from a cloud computing environment that performs the audio reconstruction process in-cloud.

8. The method according to claim 7, further comprising: performing, in a case where the noise level is below a first threshold, signal processing on the audio input on the edge device.

9. The method according to claim 7, further comprising: performing, in a case where the noise level is above a first threshold, a noise suppression process on the audio input on the edge device.

10. The method according to claim 7, further comprising:

performing, in a case where the noise level is above a second threshold, a noise suppression process on the audio input on the edge device, thereby generating on-device processed audio input, and transmitting, by the edge device to an in-cloud audio processing server, an instruction causing the in-cloud audio processing server to perform an audio reconstruction process on the on-device processed audio input.

11. The method according to claim 7, further comprising:

determining by the edge device, an inability to suppress the noise; and communicating through an interface a message indicating the inability to suppress the noise.

12. The method according to claim 7, further comprising:

measuring by the edge device, from the audio input, audio signals at frequencies and amplitudes associated with noise; and determining by the edge device, from the frequencies and amplitudes of the audio signals, the noise level corresponding to the noise.

13. A non-transitory computer-readable medium having stored thereon one or more sequences of instructions for causing one or more computing devices to perform:

receiving, from a microphone array, an audio input;

measuring, using the audio input, a noise level corresponding to a noise; and determining, based on the noise level, whether to perform either (i) a noise suppression process on the audio input on an apparatus operating as an edge device to suppress the noise thereby generating a noise suppressed audio input, or (ii) the noise suppression process on the audio input on the apparatus to suppress the noise thereby generating a noise suppressed audio input and an audio reconstruction process in-cloud on the noise suppressed audio input thereby generating a reconstructed noise suppressed audio signal, and wherein the edge device controls data flow at a boundary between two networks and is located remote from a cloud computing environment that performs the audio reconstruction process in-cloud.

14. The non-transitory computer-readable medium of claim 13, further having stored thereon a sequence of instructions for causing the one or more computing devices to perform:

device signal processing on the audio input in a case where the noise level is below a first threshold on the edge device.

15. The non-transitory computer-readable medium of claim 13, further having stored thereon a sequence of instructions for causing the one or more computing devices to perform:

noise suppression on the audio input in a case where the noise level is above a first threshold on the edge device.

16. The non-transitory computer-readable medium of claim 13, further having stored thereon a sequence of instructions for causing the one or more computing devices to perform:

noise suppression on the audio input on the edge device, thereby generating on-device processed audio input in a case where the noise level is above a second threshold, and transmitting, by the edge device to an in-cloud audio processing server, an instruction causing the in-cloud audio processing server to perform an audio reconstruction process on the on-device processed audio input.

17. The non-transitory computer-readable medium of claim 13, further having stored thereon a sequence of instructions for causing the one or more computing devices to perform:

determining by the edge device, an inability to suppress the noise; and communicating through an interface a message indicating the inability to suppress the noise.

18. The non-transitory computer-readable medium of claim 13, further having stored thereon a sequence of instructions for causing the one or more computing devices to perform:

measuring by the edge device, from the audio input, audio signals at frequencies and amplitudes associated with noise; and determining by the edge device, from the frequencies and amplitudes of the audio signals, the noise level corresponding to the noise.

* * * * *